(12) United States Patent
Furukawa

(10) Patent No.: US 10,591,893 B2
(45) Date of Patent: Mar. 17, 2020

(54) MOTOR DRIVING APPARATUS

(71) Applicant: CANON KABUSHIKI KAISHA, Tokyo (JP)

(72) Inventor: Nobuyuki Furukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/410,187

(22) Filed: Jan. 19, 2017

(65) Prior Publication Data

US 2017/0212496 A1   Jul. 27, 2017

(30) Foreign Application Priority Data

Jan. 21, 2016   (JP) ................................. 2016-010183

(51) Int. Cl.
*G05B 19/406*   (2006.01)
*H02K 11/215*   (2016.01)
(Continued)

(52) U.S. Cl.
CPC ......... *G05B 19/406* (2013.01); *G05B 19/416* (2013.01); *H02K 11/215* (2016.01);
(Continued)

(58) Field of Classification Search
CPC .......... G02B 7/08; G02B 27/646; G02B 7/09; G03B 3/10; G03B 2205/0069
See application file for complete search history.

(56) References Cited

U.S. PATENT DOCUMENTS 6,225,770 B1 *   5/2001   Heinrich ............... E05F 15/603
                                                       318/463
8,600,698 B2 *  12/2013   Chang ................... G06F 3/0416
                                                       702/150
(Continued)

FOREIGN PATENT DOCUMENTS

CN      102629813 A      8/2012
CN      104852637 A      8/2015
(Continued)

OTHER PUBLICATIONS

WO2014103258A1 has been attached.*
(Continued)

*Primary Examiner* — Shawki S Ismail
*Assistant Examiner* — Zoheb S Imtiaz
(74) *Attorney, Agent, or Firm* — Cowan, Liebowitz & Latman, P.C.

(57) ABSTRACT

A motor driving apparatus comprises a motor including a rotor that is rotatable and has a magnet whose outer peripheral surface divided in a circumferential direction is magnetized in multiple poles with alternating different polarities, and a position detecting unit having a first detecting element, a second detecting element, a third detecting element and a fourth detecting element, each of which detects a magnet pole, a driving unit that drives the motor on the basis of signals output from the first to fourth detecting elements, and a controlling unit that obtains a rotational quantity of the motor on the basis of signals output from the first and second detecting elements and that outputs a control signal of the motor to the driving unit on the basis of the rotational quantity of the motor.

16 Claims, 21 Drawing Sheets

(51) Int. Cl.
*H02K 11/33* (2016.01)
*G05B 19/416* (2006.01)

(52) U.S. Cl.
CPC .... *H02K 11/33* (2016.01); *G05B 2219/33114* (2013.01); *G05B 2219/41112* (2013.01); *G05B 2219/42237* (2013.01); *G05B 2219/45178* (2013.01); *G05B 2219/45184* (2013.01)

(56) References Cited

U.S. PATENT DOCUMENTS

| | | | | |
|---|---|---|---|---|
| 2010/0329712 | A1* | 12/2010 | Fukutani | G03G 15/0131 399/49 |
| 2013/0050306 | A1* | 2/2013 | Sohara | B41J 29/38 347/5 |
| 2014/0015384 | A1* | 1/2014 | Someya | G01D 5/2454 310/68 B |
| 2014/0159631 | A1* | 6/2014 | Suk | H02P 6/182 318/400.34 |
| 2015/0295525 | A1* | 10/2015 | Liu | H02P 6/16 318/400.04 |
| 2015/0326157 | A1* | 11/2015 | Aoshima | H02K 37/14 318/685 |

FOREIGN PATENT DOCUMENTS

| | | |
|---|---|---|
| CN | 104885348 A | 9/2015 |
| CN | 105245136 A | 1/2016 |
| GB | 2239112 A | 6/1991 |
| JP | 07-087768 A | 3/1995 |
| JP | 2001-028894 A | 1/2001 |
| JP | 2006-174640 A | 6/2006 |
| JP | 2011-186181 A | 9/2011 |
| JP | 2014-128143 A | 7/2014 |
| WO | WO2014103258 * | 3/2014 |

OTHER PUBLICATIONS

The above documents were cited in a Aug. 15, 2019 Chinese Office Action, which is enclosed with an English Translation, that issued in Chinese Patent Application No. 201710048386.7.

The above documents were cited in a Dec. 3, 2019 Japanese Office Action, which is enclosed with an English Translation, that issued in Chinese Patent Application No. 2016010183.

* cited by examiner

CLOCKWISE ROTATION AT HIGH SPEED

CLOCKWISE ROTATION AT LOW SPEED

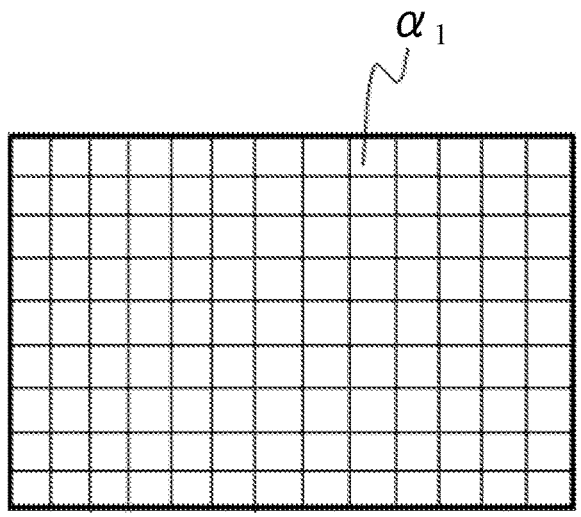
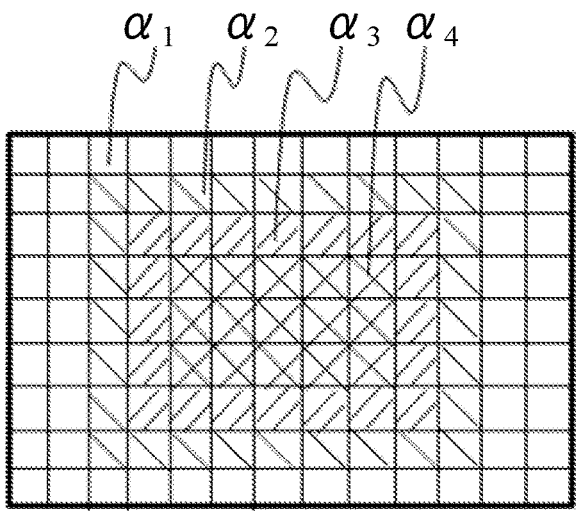
FIG. 8A                    FIG. 8B
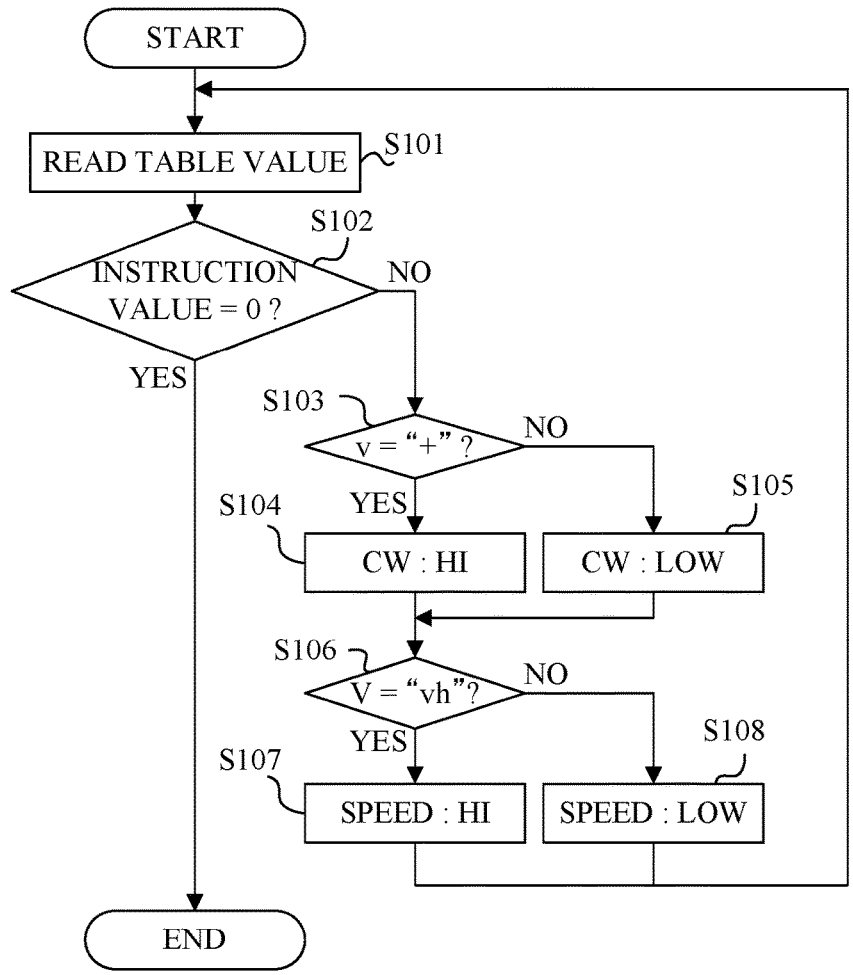
FIG. 9

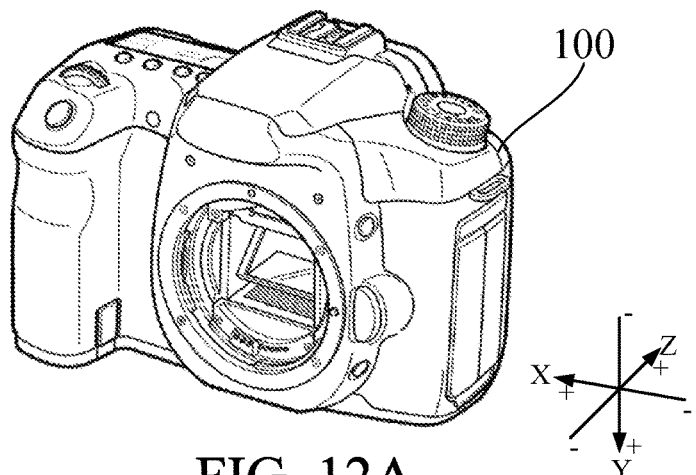
FIG. 12A
| | Z-AXIS ROTATIONAL ANGLE | | | | | | | | |
|---|---|---|---|---|---|---|---|---|---|
| | -180° TO -135° | -135° TO -90° | -90° TO -45° | -45° TO -15° | -15° TO +15° | +15° TO +45° | +45° TO +90° | +90° TO +135° | +135° TO +180° |
| -180° TO -135° | A11 | A21 | A31 | A41 | A51 | A61 | A71 | A81 | A91 |
| -135° TO -90° | A12 | A22 | A32 | A42 | A52 | A62 | A72 | A82 | A92 |
| -90° TO -45° | A13 | A23 | A33 | A43 | A53 | A63 | A73 | A83 | A93 |
| -45° TO -15° | A14 | A24 | A34 | A44 | A54 | A64 | A74 | A84 | A94 |
| -15° TO +15° | A15 | A25 | A35 | A45 | Vth0 | A65 | A75 | A85 | A95 |
| +15° TO +45° | A16 | A26 | A36 | A46 | A56 | A66 | A76 | A86 | A96 |
| +45° TO +90° | A17 | A27 | A37 | A47 | A57 | A67 | A77 | A87 | A97 |
| +90° TO +135° | A18 | A28 | A38 | A48 | A58 | A68 | A78 | A88 | A98 |
| +135° TO +180° | A19 | A29 | A39 | A49 | A59 | A69 | A79 | A89 | A99 |
X-AXIS ROTATIONAL ANGLE
FIG. 12B
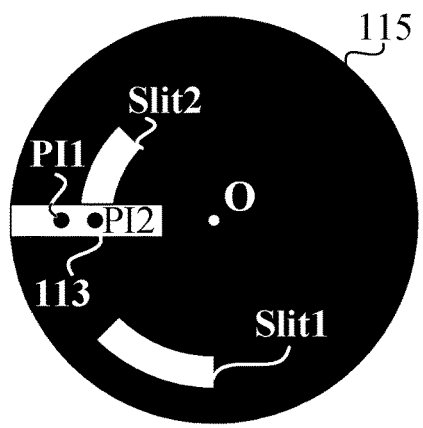
FIG. 13

MOTOR DRIVING APPARATUS

BACKGROUND OF THE INVENTION

Field of the Invention

The present invention relates to a motor driving apparatus.

Description of the Related Art

Japanese Patent Laid-Open No. 2014-128143 discloses a motor driving apparatus that regulates an arrangement of a plurality of detecting elements and that performs motor control on the basis of signals output from the plurality of detecting elements.

The conventional art disclosed in Japanese Patent Laid-Open No. 2014-128143 is effective against motor control when a rotational speed of a motor is previously set, but, in an optical apparatus demanding complicated driving of a control object, changing a setting of a motor is required according to a position and a speed of the control object.

FIG. 22 is a block diagram of an apparatus including a conventional motor driving apparatus that performs feedback control. A motor control circuit 1002 controls a motor 1004 through a motor driver 1003 on the basis of an instruction speed instructed by a central processing unit (CPU) 1001. A motor detecting sensor 1005 outputs a detection pulse to the motor control circuit 1002 through a signal line SIG1 in accordance with an operation of the motor 1004. A loop where the motor control circuit 1002 controls a rotational speed of the motor 1004 through the motor driver 1003 using a detection pulse that is output from the motor detecting sensor 1005 to feed back to the motor control circuit 1002 is a motor speed control loop.

The motor 1004 drives a drive object 1007 such as a lens for automatic focusing and a mirror in an image pickup apparatus through a mechanical transmission system 1006. An operation of the drive object 1007 is detected by a drive object detecting sensor 1008 such as an encoder, and position information of the drive object is fed back to the CPU 1001 through a signal line SIG2. A loop where the CPU 1001 controls the motor 1004 through the motor driving circuit 1002 and the motor driver 1003 using the position information that is output from the drive object detecting sensor 1008 to feed back to the CPU 1001 is a drive object control loop.

As explained above, the driving object detecting sensor 1008 is required in the drive object control loop, and the motor detecting sensor 1005 is required in the motor speed control loop. That is, providing two sensors is required, but if these sensors can be unified, reducing costs and miniaturizing an apparatus can be achieved. For example, if the output from the motor detecting sensor 1005 can be fed back to the CPU 1001, providing the drive object detecting sensor 1008 is not required. However, in the conventional art disclosed in Japanese Patent Laid-Open No. 2014-128143, each of a plurality of sensors is arranged at a complicated angle in consideration of an electric advanced angle, and thus, as a phase of a wavelength obtained by summing outputs of these sensors becomes complex, an output of the motor cannot be simply connected to a controller.

SUMMARY OF THE INVENTION

In the view of the problem, an object of the present invention is to provide a motor driving apparatus having excellent controllability at low cost.

A motor driving apparatus according to one aspect of the present invention comprises a motor including a rotor that is rotatable and that has a magnet whose outer peripheral surface divided in a circumferential direction is magnetized in multiple poles with alternating different polarities, and a position detecting unit having a first detecting element, a second detecting element, a third detecting element and a fourth detecting element, each of which detects a magnet pole, a driving unit that drives the motor on the basis of signals output from the first to fourth detecting elements, and a controlling unit that obtains a rotational quantity of the motor on the basis of signals output from the first and second detecting elements and that outputs a control signal of the motor to the driving unit on the basis of the rotational quantity of the motor.

Further features of the present invention will become apparent from the following description of exemplary embodiments with reference to the attached drawings.

BRIEF DESCRIPTION OF THE DRAWINGS

FIGS. 8A and 8B are schematic diagrams illustrating an output correcting chart of a photometric sensor.

FIG. 9 is a flowchart of a driving method of a motor (first example).

FIGS. 12A and 12B are explanatory diagrams of attitude of a main body and a correction value (second example).

FIG. 13 is a positional relation diagram of a position detector and a rotating plate (third example).

DESCRIPTION OF THE PREFERRED EMBODIMENTS

Figure 1:
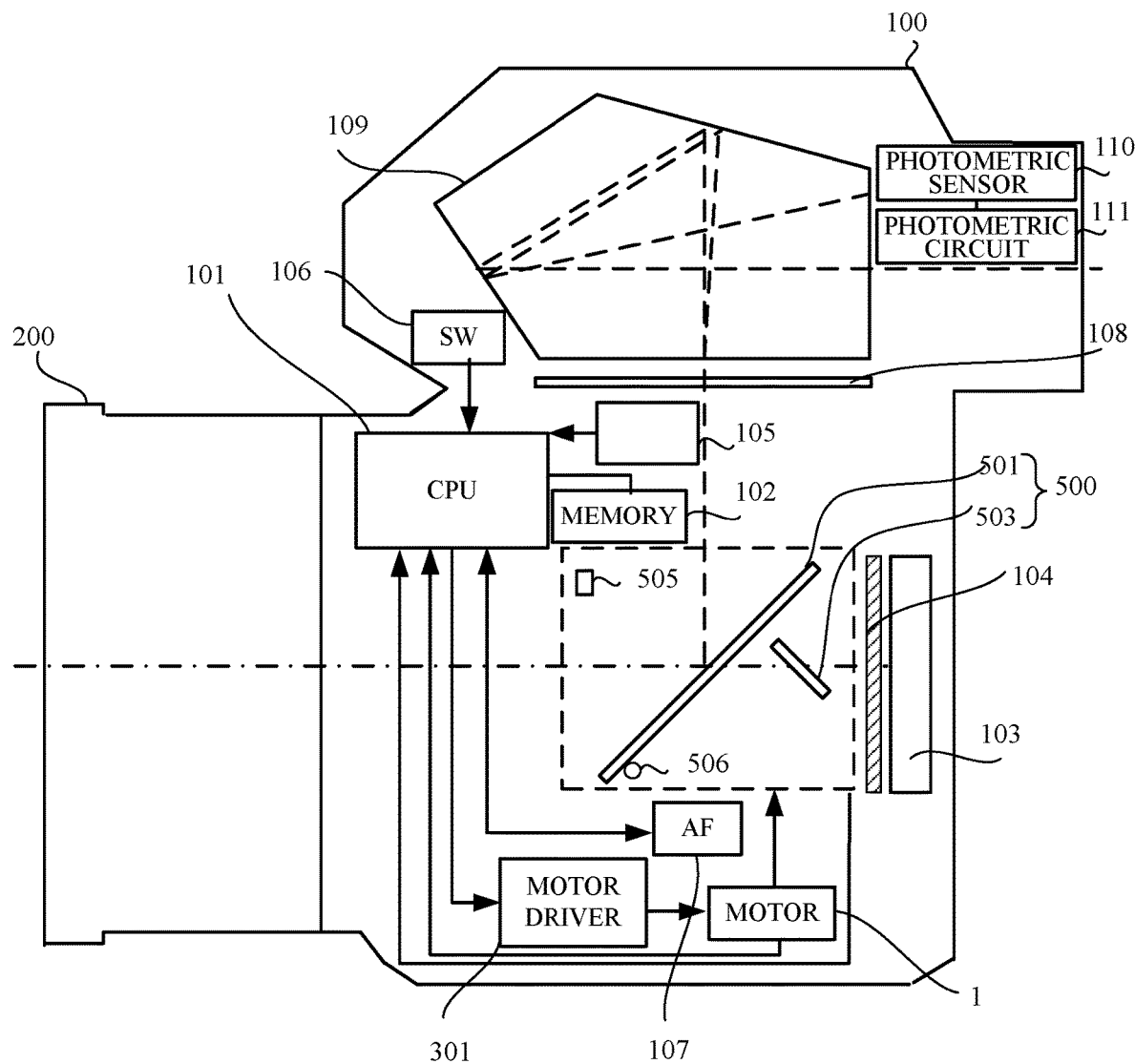
FIG. 1 is a block diagram of an image pickup apparatus according to an embodiment of the present invention.

Exemplary embodiments of the present invention will be described below with reference to the accompanied drawings. In each of the drawings, the same elements will be denoted by the same reference numerals and the duplicate descriptions thereof will be omitted.

FIG. 1 is a block diagram of an image pickup apparatus according to an embodiment of the present invention. The image pickup apparatus includes a main body 100 and a lens 200 detachably attached to the main body 100. A CPU (controlling unit) 101 controls each part of the main body 100. A memory 102 is a memory such as a random access memory (RAM) and read only memory (ROM) connected to the CPU 101, and may be incorporated in the CPU 101. An image pickup element 103 photoelectrically converts an object image transmitted through the lens 200 and outputs an image signal. A shutter 104 shades the image pickup element 103 when not imaging, and opens to guide the object image to the image pickup element 103 when imaging. A motor driver (driving unit) 301 drives a motor 1 to drive a mirror unit 500. An attitude detector 105 detects attitude of the main body 100. A release switch 106 includes a first switch (hereinafter referred to as "SW1") turned on by a half depressing operation and a second switch (hereinafter referred to as "SW2") by a full depressing operation.

Figure 2:
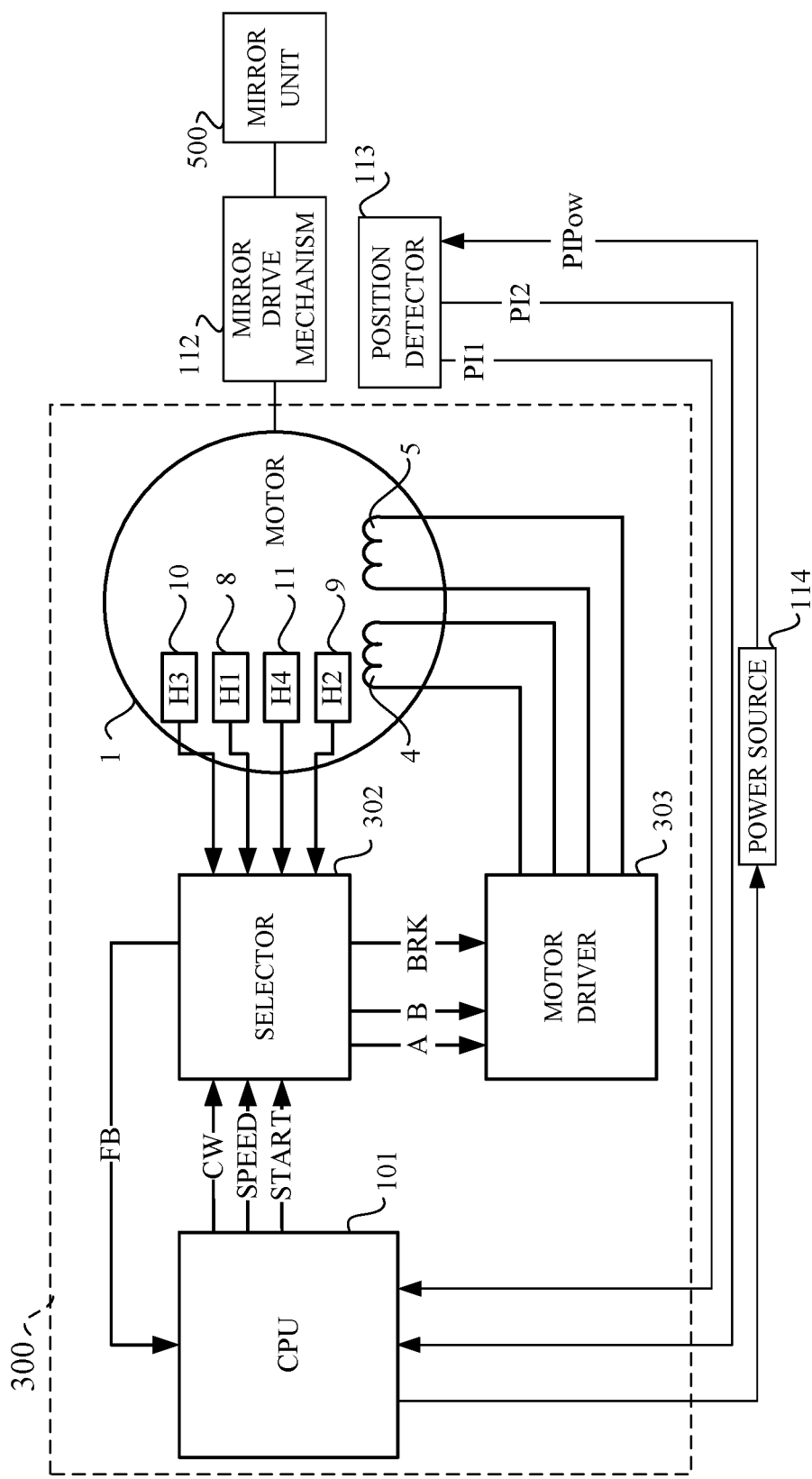
FIG. 2 is a block diagram of a motor driving apparatus.

FIG. 2 is a block diagram of a motor driving apparatus 300. The motor driving apparatus 300 includes the CPU 101, a selector 302, a motor driver 303 and the motor 1. The CPU 101 outputs a control signal of the motor 1. The selector 302 and the motor driver 303 are provided in the motor driver 301. The selector 302 distributes outputs of sensors of the motor 1 and outputs a driving signal of the motor 1 according to instructions of the CPU 101. The motor driver 303 supplies power to the motor 1 on the basis of the driving signal output from the selector 302. A mirror drive mechanism 112 transmits driving force of the motor 1 to a mirror unit 500. A position detector (position detecting unit) 113 detects a position of the mirror unit 500. A power source 114 supplies power to the position detector 113. In this embodiment, the motor driving apparatus 300 drives the mirror unit 500, but may drive a shutter. Additionally, in this embodiment, the CPU 101 controls the motor 1, but a controlling unit having a configuration different from that of the CPU 101 may control the motor 1.

Figure 3:
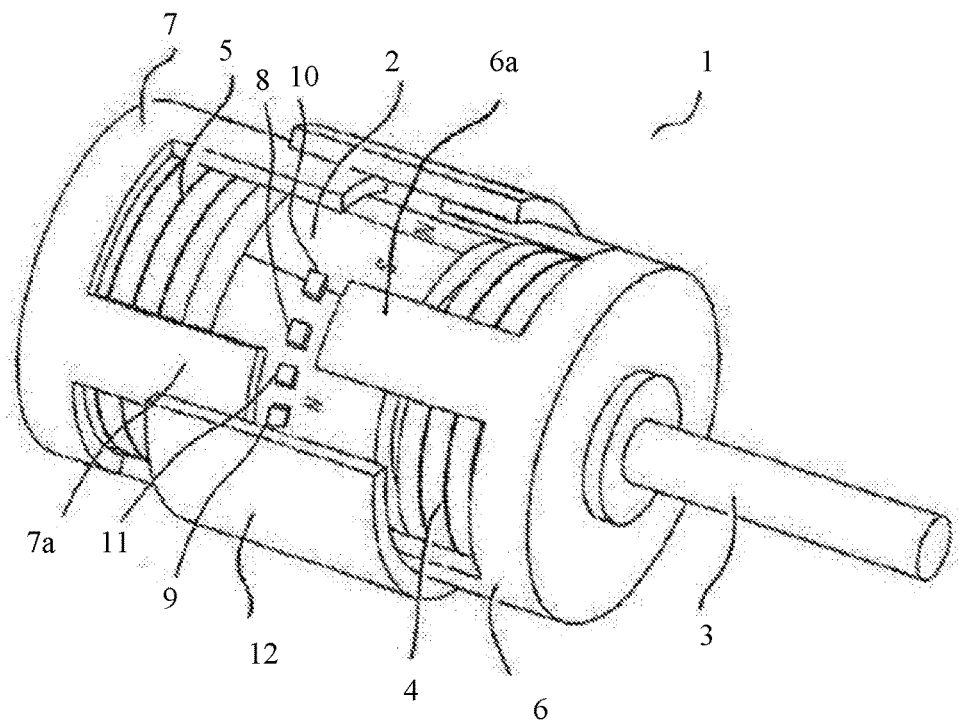
FIG. 3 is an external perspective view of a motor.

FIG. 3 is an external perspective view of the motor 1. In FIG. 3, for purposes of illustration, some parts are broken. A rotor 3 includes a magnet 2 and are controlled in rotation by the motor driver 303. The magnet 2 is formed in a cylindrical shape, and an outer peripheral surface thereof, which is divided in a circumferential direction, is magnetized in multiple poles with alternating different polarities. In this embodiment, the magnet 2 is divided into 8 parts, that is, is magnetized in 8 poles. The magnet 2 may be magnetized not only in 8 poles but also in 4 poles or 12 poles. A first coil 4 is arranged at a first end in an axis direction of the magnet 2. A first yoke 6 is made of a soft magnetic material, and is opposed to the outer peripheral surface of the magnet 2 to form a gap between them. Alternatively, the first yoke 6 includes a plurality of first magnetic pole parts 6a that extend from an annular main body in the axis direction and that are arranged at a predetermined interval in the circumferential direction. The first magnetic pole parts 6a are excited when the first coil 4 is energized. The first coil 4, the first yoke 6 and the magnet 2 opposed to the plurality of first magnetic pole parts 6a form a first stator unit. A second coil 5 is arranged at a second end opposite to the first end, where the first coil 4 is attached, in the axis direction of the magnet 2. A second yoke 7 is made of a soft magnetic material, and is opposed to the outer peripheral surface the magnet 2 to form a gap between them. Alternatively, the second yoke 7 includes a plurality of second magnetic pole parts 7a that extend from an annular main body in the axis direction and that are arranged at a predetermined interval in the circumferential direction. The second magnetic pole parts 7a are excited when the second coil 5 is energized. The second coil 5, the second yoke 7 and the magnet 2 opposed to the plurality of second magnetic pole parts 7a form a second stator unit. Switching each pole (N-pole or S-pole) excited in the first and second magnetic pole parts 6a and 7a can change torque given to the rotor 3.

A first magnetic sensor (first detecting element) 8, a second magnetic sensor (second detecting element) 9, a third magnetic sensor (third detecting element) 10 and a fourth magnetic sensor (fourth detecting element) 11 are sensors such as a hall element, a magnetoresistance effect element (MR element) and an inductive sensor, and are fixed to a motor cover 12. In this embodiment, when a magnetic pole is detected, the first to fourth magnetic sensors 8 to 11 output a signal H1, a signal H2, a signal H3 and a signal H4, respectively. The motor cover 12 firmly holds the first and second yokes 6 and 7 so that the first and second magnetic pole parts 6a and 7a are arranged at positions shifted from a magnetizing phase of the magnet 2 by an electric angle of approximately 90 degrees. The electric angle 9 is an angle when one period of magnetic force is expressed as 360 degrees, and is represented by the following expression when the number of magnetic poles of a rotor is M and a mechanical angle is θ0.

$$\theta = \theta 0 \times M/2$$

In this embodiment, as the magnet 2 is magnetized in 8 poles, the electric angle of 90 degrees corresponds to the mechanical angle of 22.5 degrees.

The CPU 101, as illustrated in FIG. 2, performs control instructions of the motor 1 to the selector 302 using three signal lines. A signal line CW is a signal line to indicate a rotational direction of the motor 1. When an output signal level of the signal line CW is "Hi", the motor 1 is rotated rightward (CW) as viewed from a side where the axis of the rotor 3 protrudes, and when the output signal level of the signal line CW is "Low", the motor 1 is rotated leftward (CCW). A signal line SPEED is a signal line to indicate a rotational speed of the motor 1. In this embodiment, two types of speed indications that when an output signal level of the signal line SPEED is "Hi", the motor 1 is rotated at a "high speed", and the output signal level of the signal line SPEED is "Low", the motor 1 is rotated at a "low speed" are performed, but the present invention is not limited to this. For example, an indication capable of arbitrary setting a rotational speed value (rpm) may be performed. A signal line START is a signal line to indicate a start and a stop of a drive of the motor 1. When an output signal level of the signal line START is "Hi", the drive of the motor 1 is started, and when the output signal level of the signal line START is "Low", the drive of the motor 1 is stopped. Providing the signal line SPEED with the function of the signal line START can omit the signal line START.

The selector 302 outputs a feedback (FB) pulse corresponding to a rotational position of the rotor 3 to the CPU 101 through a signal line FB. The CPU 101 obtains a rotational quantity of the motor 1 by counting the FB pulse. The CPU 101 also calculates the rotational speed of the motor 1 on the basis of a pulse width of the FB pulses.

Moreover, the selector 302 outputs a signal A when controlling the first coil 4, and outputs a signal B when controlling the second coil 5. The motor driver 303 supplies power to the first coil 4 when obtaining the signal A, and supplies power to the second coil 5 when obtaining the signal B.

Figure 4:
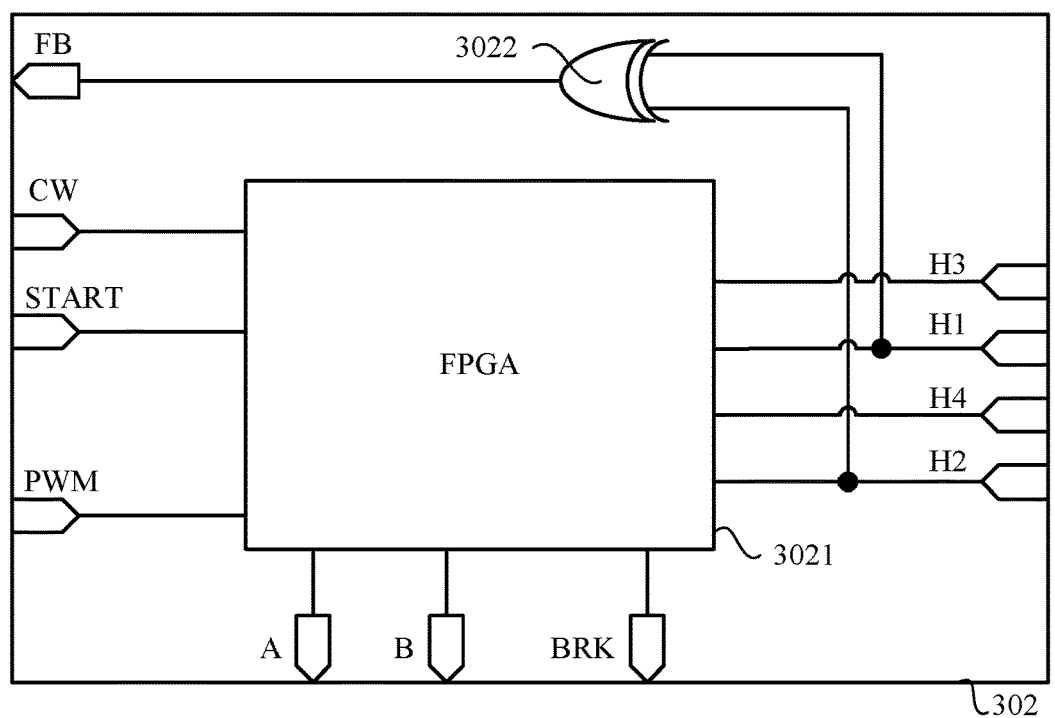
FIG. 4 is an internal circuit diagram of a selector.

FIG. 4 is an internal circuit diagram of the selector 302. The selector 302 includes a logical circuit 3021 such as a field programmable gate array (FPGA) and an exclusive OR circuit 3022. The signals H1 and H2 respectively output from the first and second magnetic sensors 8 and 9 are branched inside the selector 302, and are input to the logical circuit 3021 and the exclusive OR circuit 3022. The signals H3 and H4 respectively output from the third and fourth magnetic sensors 10 and 11 are not branched inside the selector 302, and are only input to the logical circuit 3021. In this embodiment, as each of the signals H1 and H2 is output by 8 pulses during a single revolution of the rotor 3, 16 pulse signals are input to the exclusive OR circuit 3022. A PWM signal is input to the motor driver 303 as a BRK signal through inside the logical circuit 3021.

A Table 1 provides a truth value of the logical circuit 3021. When the output signal level of the CW signal is "Hi" and the output signal level of the SPEED signal is "Hi", the signal A becomes a signal with a reverse phase of the signal H1 and the signal B becomes a signal with the same phase of the signal H2. When the output signal level of the CW signal is "Hi" and the output signal level of the SPEED signal is "Low", the signals A becomes a signal with a reverse phase of the signal H3 and the signal B becomes a signal with the same phase of the signal H4. When the output signal level of the CW signal is "Low" and the output signal level of the SPEED signal is "Hi", the signal A becomes a signal with the same phase of the signal H3 and the signal B becomes a signal with a reverse phase of the signal H4. When the output signal level of the CW signal is "Low" and the output signal level of the SPEED signal is "Low", the signals A becomes a signal with the same phase of the signal H1 and the signal B becomes a signal with a reverse phase of the signal H2.

TABLE 1

| CW | SPEED | A | B |
|---|---|---|---|
| Hi: CW | High Speed | Reverse phase of signal H1 | Same phase of signal H2 |
| Hi: CW | Low Speed | Reverse phase of signal H3 | Same phase of signal H4 |
| Low: CCW | High Speed | Same phase of signal H3 | Reverse phase of signal H4 |
| Low: CCW | Low Speed | Same phase of signal H1 | Reverse phase of signal H2 |

In other words, the motor driver 303 controls the drive of the motor 1 as follows.

When the rotational direction is the clockwise direction and the rotational speed is the high speed, the motor driver 303 supplies power to the first coil 4 on the basis of the signal H1 output from the first magnetic sensor 8, and supplies power to the second coil 5 on the basis of the signal H2 output from the second magnetic sensor 9.

When the rotational direction is the clockwise direction and the rotational speed is the low speed, the motor driver 303 supplies power to the first coil 4 on the basis of the signal H3 output from the third magnetic sensor 10, and supplies power to the second coil 5 on the basis of the signal H4 output from the fourth magnetic sensor 11.

When the rotational speed is the high speed, the motor driver 303 supplies power to the first coil 4 on the basis of the signal H3 output from the third magnetic sensor 10, and supplies power to the second coil 5 on the basis of the signal H4 output from the fourth magnetic sensor 11.

When the rotational direction is the counterclockwise direction and the rotational speed is the low speed, the motor driver 303 supplies power to the first coil 4 on the basis of the signal H1 output from the first magnetic sensor 8, and supplies power to the second coil 5 on the basis of the signal H2 output from the second magnetic sensor 9.

Herein, the clockwise direction corresponds to a first direction, and the counterclockwise direction corresponds to a second direction opposite to the first direction. The rotational speed where the rotational direction is the clockwise direction and the rotational speed is the high speed corresponds to a first speed, and the rotational speed where the rotational direction is the clockwise direction and the rotational speed is the low speed corresponds to a second speed lower than the first speed. The rotational speed where the rotational direction is the counterclockwise direction and the rotational speed is the high speed corresponds to a third speed, and the rotational speed where the rotational direction is the counterclockwise direction and the rotational speed is the low speed corresponds to a fourth speed lower than the third speed.

In this embodiment, the first speed is almost the same as the third speed, and the second speed is almost the same as the fourth speed.

Figure 5A:
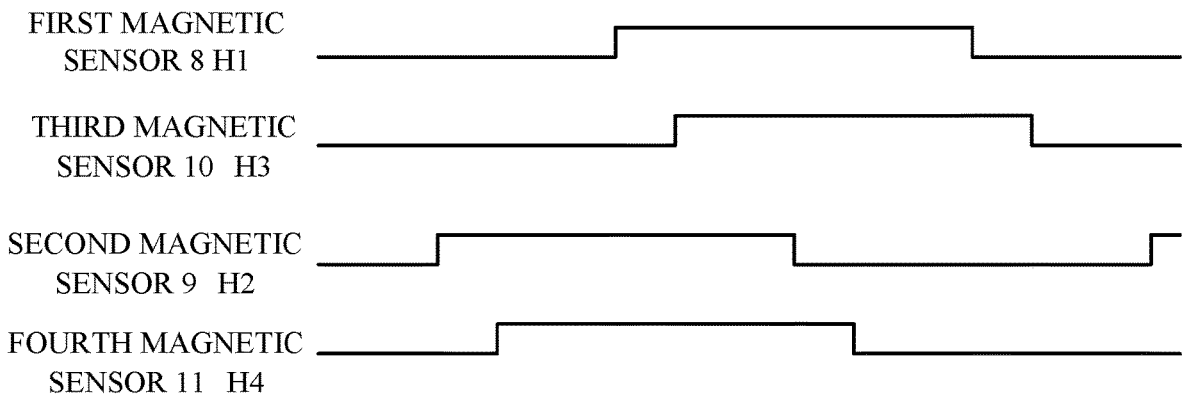
FIGS. 5A to 5C are waveforms of a phase variation of each signal.
Figure 5B:
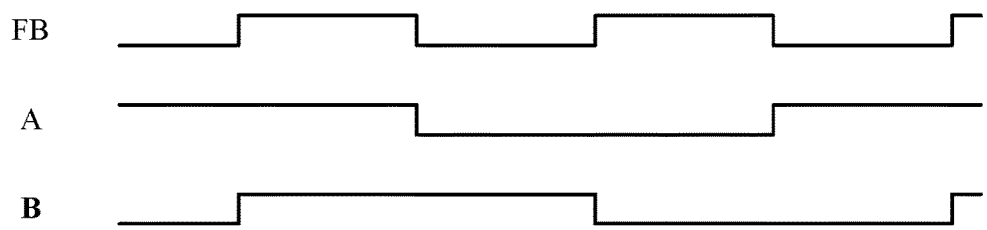
Figure 5C:
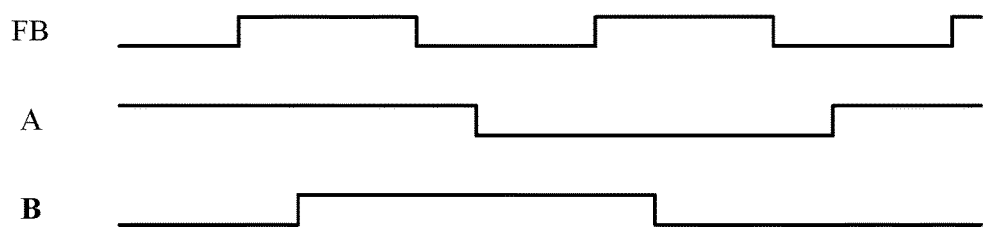
Figure 6A:
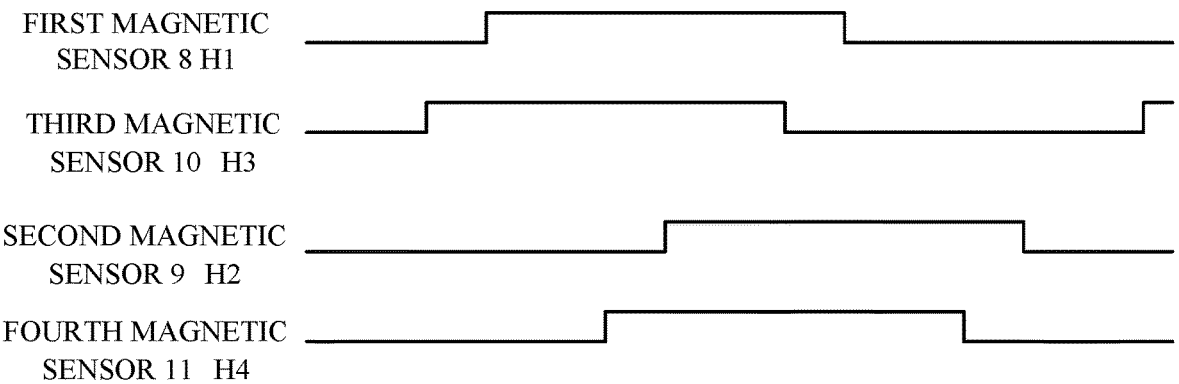
FIGS. 6A to 6C are waveforms of a phase variation of each signal.
Figure 6B:
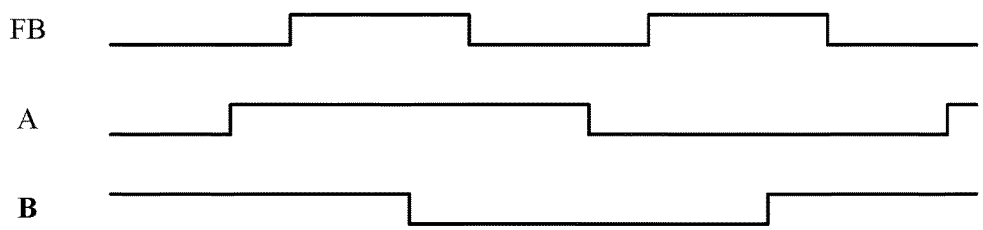
Figure 6C:
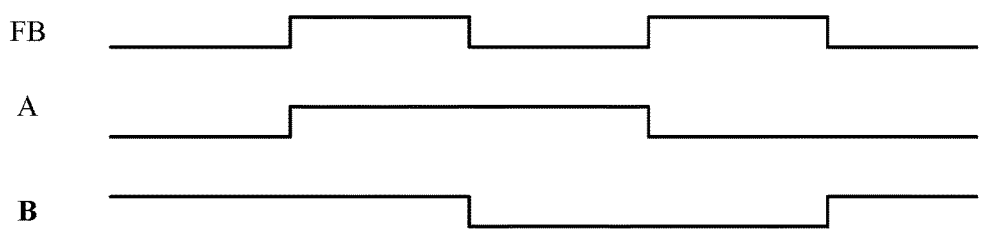

With reference to FIGS. 5A to 5C and FIGS. 6A to 6C, the signal output from each magnetic sensor while the rotor 3 rotates will be explained. FIGS. 5A to 5C are waveforms of a phase variation of each signal when the CPU 101 sets the output signal level of the CW signal to "Hi". FIGS. 6A to 6C are waveforms of a phase variation of each signal when the CPU 101 sets the output signal level of the CW signal to "Low". In FIGS. 5A to 5C and FIGS. 6A to 6C, as advancing to the right side, time proceeds.

When the output signal level of the CW signal is "Hi", the motor 1 performs the clockwise rotation (normal rotation) as viewed from the side where the axis of the rotor 3 protrudes. FIG. 5A illustrates the phase of the signal output from each magnetic sensor. As illustrated in FIG. 5A, when each magnetic sensor detects the N pole of the magnet 2, the output signal level of the signal output from each magnetic sensor becomes "Hi", and each magnetic sensor detects the S pole of the magnet 2, the output signal level of the signal output from each magnetic sensor becomes "Low". Firstly, when the second magnetic sensor 9 approaches to the N pole, the output signal level of the signal H2 changes to "Hi". Subsequently, when the fourth magnetic sensor 11 approaches to the N pole, the output signal level of the signal H4 changes to "Hi". Similarly, when the first magnetic sensor 8 approaches to the N pole, the output signal level of the signal H1 changes to "Hi", and when the third magnetic sensor 10 approaches to the N pole, the output signal level of the signal H3 changes to "Hi".

FIG. 5B illustrates the FB pulse and the signals A and B when the CPU 101 sets the output signal levels of the CW signal and the SPEED signal to "Hi" to rotate the motor 1 at the high speed. The FB pulse is a composite signal obtained by executing the exclusive OR of the signal H1 output from the first magnetic sensor 8 and the signal H2 output from the second magnetic sensor 9, and is the pulse signal corresponding to the rotational position of the rotor 3. In this embodiment, the FB pulse is the composite signal obtained by executing the exclusive OR of the signals H1 and H2, but the present invention is not limited to this. As calculation becomes easy if phase differences between the signals are 45 degrees like this embodiment, the FB pulse may be obtained using a composite signal based on the signal H3 output from the third magnetic sensor 10 and the signal H4 output from the fourth magnetic sensor 11. As the output signal levels of the CW signal and the SPEED signal are "Hi", the signal A becomes the signal with the reverse phase of the signal H1 and the signal B becomes the signal with the same phase of the signal H2 according to the table 1.

FIG. 5C illustrates the FB pulse and the signals A and B when the CPU 101 set the output signal level of the CW signal to "Hi" and the output signal level of the SPEED signal to "Low" to rotate the motor 1 at the low speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the signal levels of the CW signal and the SPEED signal are respectively "Hi" and "Low", the signal A becomes the signal with the reverse phase of the signal H3 and the signal B becomes the signal with the same phase of the signal H4.

When the output signal level of the CW signal is "Low", the motor 1 performs the counterclockwise rotation (reverse rotation) as viewed from the side where the axis of the rotor 3 protrudes. FIG. 6A illustrates the phase of the signal output from each magnetic sensor. As illustrated in FIG. 6A, when each magnetic sensor detects the N pole of the magnet 2, the output signal level of the signal output from each magnetic sensor becomes "Hi", and each magnetic sensor detects the S pole of the magnet 2, the output signal level of the signal output from each magnetic sensor becomes "Low". Firstly, when the third magnetic sensor 10 approaches to the N pole, the output signal level of the signal H3 changes to "Hi". Subsequently, when the first magnetic sensor 8 approaches to the N pole, the output signal level of the signal H1 changes to "Hi". Similarly, when the fourth magnetic sensor 11 approaches to the N pole, the output signal level of the signal H4 changes to "Hi", and when the second magnetic sensor 9 approaches to the N pole, the output signal level of the signal H2 changes to "Hi".

FIG. 6B illustrates the FB pulse and the signals A and B when the CPU 101 sets the output signal level of the CW signal to "Low" and the output signal level of the SPEED signal to "Hi" to rotate the motor 1 at the high speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the output signal levels of the CW signal and the SPEED signal are respectively "Low" and "Hi", the signal A becomes the signal with the same phase of the signal H3 and the signal B becomes the signal with the reverse phase of the signal H4.

FIG. 6C illustrates the FB pulse and the signals A and B when the CPU 101 sets the output signal levels of the CW signal and the SPEED signal to "Low" to rotate the motor 1 at the low speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the output signal levels of the CW signal and the SPEED signal are "Low", the signal A becomes the signal with the same phase of the signal H1 and the signal B becomes the signal with the reverse phase of the signal H2.

As explained above, the signals A and B shift with respect to a positional relation of the magnet 2 according to the driving mode, but the FB pulse does not shift with respect to the positional relation of the magnet 2 in either of the driving modes.

Figure 7C:
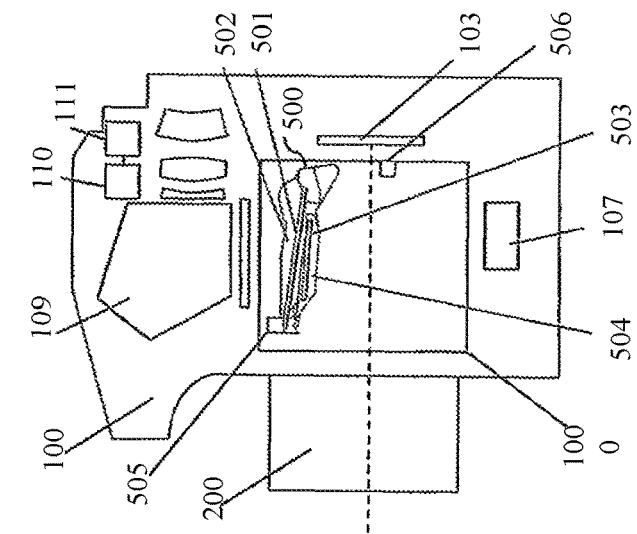
FIGS. 7A to 7C are explanatory diagrams of a mirror drive.
Figure 7B:
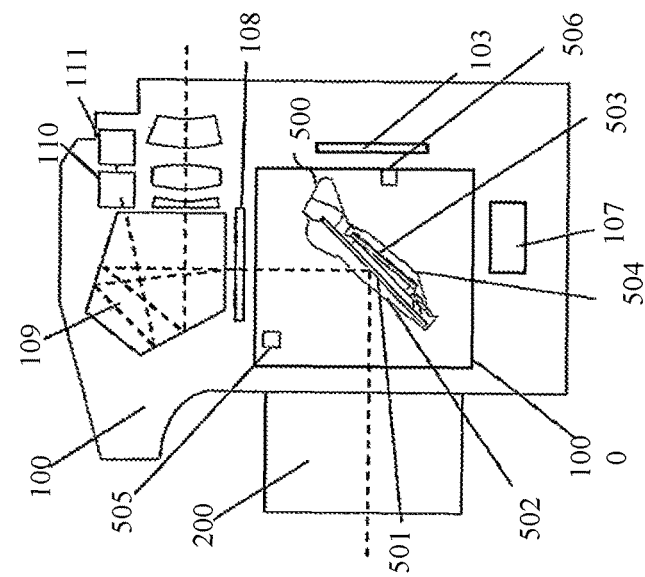
Figure 7A:
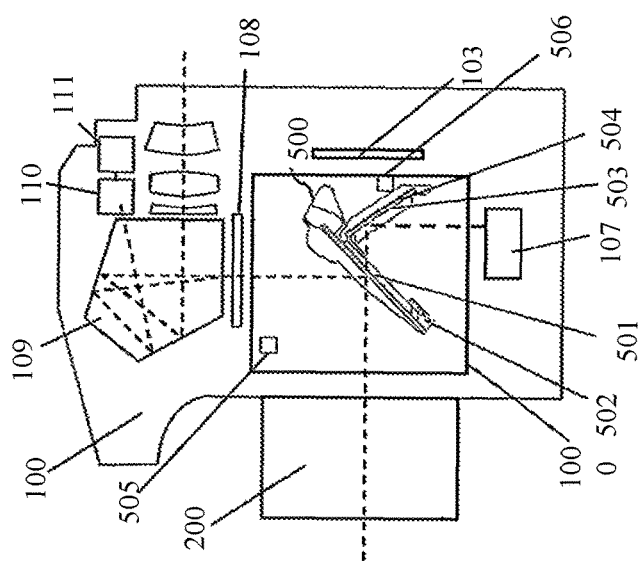

With reference to FIGS. 7A to 7C, drive (mirror drive) of the mirror unit 500 will be explained. FIGS. 7A to 7C are explanatory diagrams of the mirror drive. The mirror unit 500 is attached in a mirror box 1000. The mirror unit 500 includes a main mirror 501, a main mirror holder 502 that holds the main mirror 501, a sub mirror 503, and a sub mirror holder 504 that holds the sub mirror 503. The main mirror 501 and the main mirror holder 502 form a first mirror member. The sub mirror 503 and the sub mirror holder 504 form a second mirror member. Furthermore, in the mirror box 1000, a mirror up stopper 505 and a mirror down stopper 506 are provided.

FIG. 7A illustrates a mirror down state (hereinafter referred to as "first state") where the main mirror holder 502 and the sub mirror holder 504 are arranged in an image pickup optical path, that is, are arranged at a mirror down position. When the mirror unit 500 is in the first state, photographing light flux transmitted through the lens 200 is separated by the main mirror 501. The photographing light flux reflected by the main mirror 501 is imaged on a focusing plate 108. A pentaprism 109 guides an object image imaged on the focusing plate 108 to a photometric sensor 110. The photometric sensor 110 detects a part of the object image using a light receiving element divided to correspond to each area on a viewing screen. A photometric circuit 111 converts an output signal obtained from the photometric sensor 110 into a luminance signal of each area on the viewing screen and corrects the converted output signal by an output correcting chart corresponding to each area as illustrated in FIGS. 8A and 8B. In the output correcting chart, correction values to correct unevenness in luminance of each area and light quantity insufficiency in a low luminance state are set as a map. Instead of separately forming the photometric sensor 110 and the photometric circuit 111, they may be formed as one photometric unit. The CPU 101 calculates an exposure value on the basis of the luminance signal obtained from the photometric sensor 111. When the mirror unit 500 is in the first state, in the photographing light flux incident on the photometric sensor 110, no unevenness in luminance among areas on a light receiving surface is substantially contained, and thus the photometric circuit 111 performs the correction using the output correcting chart (first correcting chart) of FIG. 8A to perform the output correction uniformly. The correction values of the output correcting chart of FIG. 8A are set to be the same correction value $\alpha_1$ in each area. Meanwhile, the photographing light flux transmitted through the main mirror 501 is reflected by the sub mirror 503 to be guided to a focusing detector (focusing detecting unit) 107.

FIG. 7B illustrates a state (hereinafter referred to as "second state") where the main mirror holder 502 is arranged at the mirror down position and the sub mirror holder 504 is raised at a position overlapping the main mirror 501. When the mirror unit 500 is in the second state, the photographing light flux transmitted through the lens 200 is reflected by the main mirror 501 and the sub mirror 503, and is imaged on the focusing plate 108 without being guided to the focusing detector 107. When the mirror unit 500 is in the second state, the photographing light flux is not guided to the focusing detector 107, and thus a light quantity to a central part of the photometric sensor 110 increases. Accordingly, luminance at a central part of the light receiving surface of the photographing light flux to the photometric sensor 110 increases, and thus the photometric circuit 111 performs the correction using the output correcting chart (second output correcting chart) of FIG. 8B to decrease the output of the central part. The output correcting chart of FIG. 8B has, in order from the outer peripheral to the central part, a correction value $\alpha_1$, $\alpha_2$, $\alpha_3$ and $\alpha_4$ to decrease gradually.

FIG. 7C illustrates a state (hereinafter referred to as "third state") where the main mirror holder 502 and the sub mirror holder 504 are arranged outside the image pickup optical path, that is, are arranged at a mirror up position. When the mirror unit 500 is in the third state, the mirror unit 500 retreats from the image pickup optical path, and thus the light transmitted through the lens 200 is guided to the image pickup element 103.

The mirror unit 500 performs a mirror down drive to be in the third state from the first state through the second state, and a mirror up drive to be in the first state from the third state through the second state using the motor driving apparatus 300. The position detector 113 detects whether the mirror unit 500 is in the first state or the third state.

First Example

In this example, a driving method where the motor driving unit 300 drives the mirror unit 500 using the FB pulse will be omitted. FIG. 9 is a flowchart of a driving method of the motor 1 according to this example when the mirror unit 500 is driven. In this example, the motor driving apparatus 300 is controlled using a control table of the position of the motor 1 (hereinafter referred to as "motor position") and the rotational speed of the motor 1 (hereinafter referred to as "motor speed"). The motor position corresponds to the rotational quantity of the motor 1.

At step S101, the CPU 101 reads a table value of the motor speed corresponding to the current motor position. At step S102, the CPU 101 determines whether or not the table value read at step S101 is 0. If the table value is 0, the drive of the motor 1 is stopped, and otherwise, the flow advances to step S103. At step S103, the CPU 101 determines whether or not the table value read at step S101 is a positive value. If the table value is the positive value, the flow advances to step S104, and otherwise, the flow advances to step S105. At step S104, the CPU 101 sets the output signal level of the CW signal to "Hi". At step S105, the CPU 101 sets the output signal level of the CW signal to "Low". At step S106, the CPU 101 determines whether or not the motor speed is the high speed, that is, "vh". If the motor speed is "vh", the flow advances to step S107, and if the motor speed is "vl", the flow advances to step S108. At step S107, the CPU 101 sets the output signal level of the SPPED signal to "Hi". At step S108, the CPU 101 sets the output signal level of the SPPED signal to "Low".

Figure 10A:
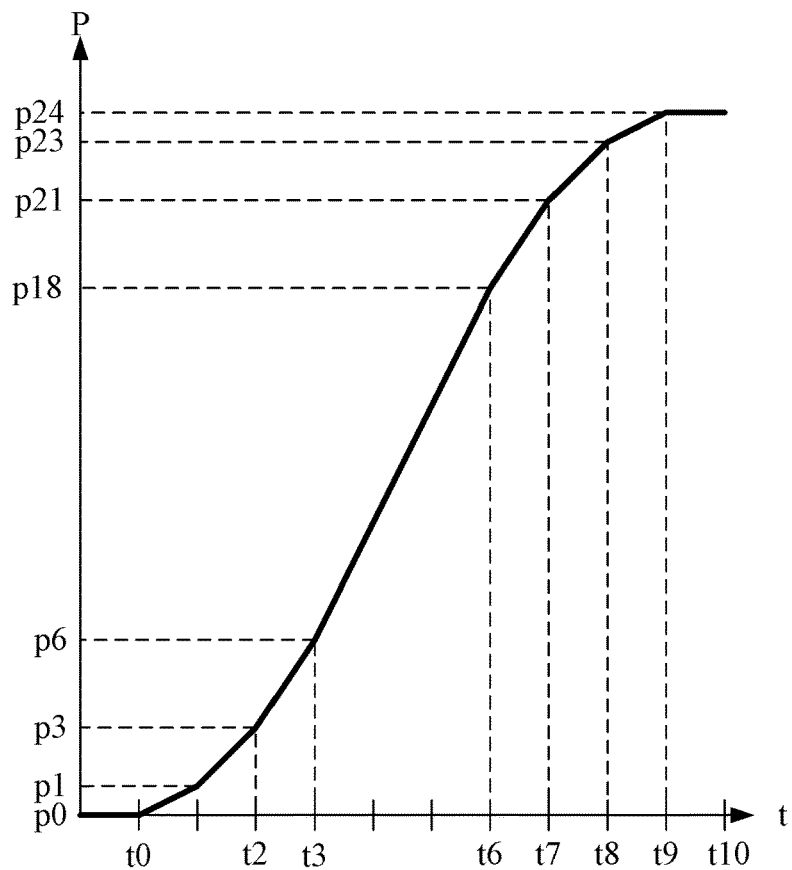
FIGS. 10A to 10C are timing charts when the motor is driven (first example).
Figure 10B:
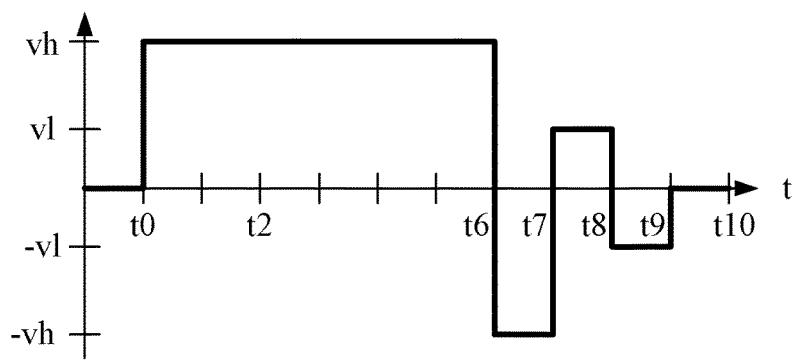
Figure 10C:
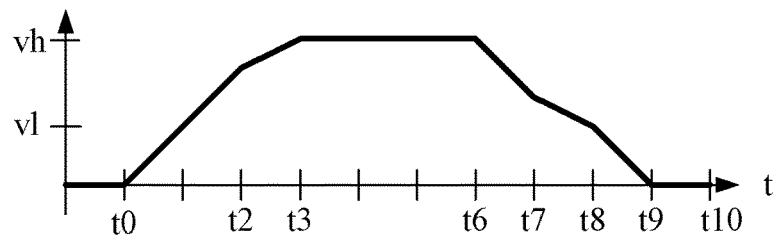

FIGS. 10A to 10C are timing charts when the motor 1 is driven using a Table 2. FIGS. 10A to 10C illustrates the motor position, the instruction speed to the motor 1, and the motor speed, respectively. The Table 2 is a control table to drive the mirror unit 500 by the motor driving apparatus 300 when the number of the FB pulses between a driving starting position and a driving stopping position is 24, and the number of rotations of the rotor 3 is 1.5. For example, the motor position "p12" is a position where a pulse edge of the FB pulse is measured 12 times, and the table value of the motor speed at that time is "vh". The motor speeds around the clockwise direction and the counterclockwise direction are a positive value and a negative value, respectively, and the motor speed "vh" is higher than the motor speed "vl".

TABLE 2

| No. | Position | Speed |
|---|---|---|
| 0 | p0~p18 | vh (CW: Hi, SPPED: Hi) |
| 1 | p18~p21 | −vh (CW: Low, SPPED: Hi) |
| 2 | p21~p23 | vl (CW: Hi, SPPED: Low) |
| 3 | p23~p24 | −vl (CW: Low, SPPED: Low) |
| 4 | p24~ | 0 |

When the motor driving apparatus 300 starts the drive of the mirror unit 500 at time t0, the CPU 101 reads the table value of the motor speed corresponding to the current motor position. As the motor position is "p0" at time t0, the CPU 101 reads "vh" as the table value. The CPU 101 sets the output signal levels of the CW signal and the SPEED signal to "Hi" according to the flow of FIG. 9. The same processing is repeated until time "t6". When the CPU 101 sets the output signal level of the SPEED signal to "Hi", the motor speed is, as illustrated in FIG. 10B, set to "vh", but the actual motor speed, as illustrated in FIG. 10C, gradually increases from time t0 and reaches "vh" at time t3.

When the motor position is "p18" at time "t6", the CPU 101 reads "−vh" as the table value. The CPU 101 sets the output signal level of the CW signal to "Low" and sets the output signal level of the SPEED signal to "Hi" according to the flow of FIG. 9. Then, the motor speed is, as illustrated in FIG. 10B, set to "−vh", but the actual motor speed, as illustrated in FIG. 10C, decreases exponentially from time "t6". The state of the motor 1 also changes the state of FIG. 6B from the state of FIG. 5B, but as the FB pulse is constant, the motor position is certainly detected.

When the motor position is "p21" at time "t7", the CPU 101 reads "vl" as the table value. The CPU 101 sets the output signal level of the CW signal to "Hi" and sets the output signal level of the SPEED signal to "Low" according to the flow of FIG. 9. Then, the motor speed is, as illustrated in FIG. 10B, set to "vl", but the actual motor speed, as illustrated in FIG. 10C, decreases moderately from time t7.

When the motor position is "p23" at time "t8", the CPU 101 reads "−vl" as the table value. The CPU 101 sets the output signal levels of the CW signal and the SPEED signal to "Low" according to the flow of FIG. 9. Then, the motor speed is, as illustrated in FIG. 10B, is set to "−vl", but the actual motor speed, as illustrated in FIG. 10C, decreases at time "t8" to be 0 until time "t9".

When the motor position is "p24" at time "t9", the CPU 101 reads "0" as the table value. The CPU 101 stops the drive of the motor 1 according to the flow of FIG. 9.

As explained above, reverse control of the motor 1 is performed three times during the drive of the motor 1, but as the phase of the FB pulse corresponding to the motor position is constant, stop control can be performed smoothly. Additionally, fine control where the rotor 3 is rotated by 1.5 rotations can be corresponded with sufficient resolution.

Second Example

Figure 11:
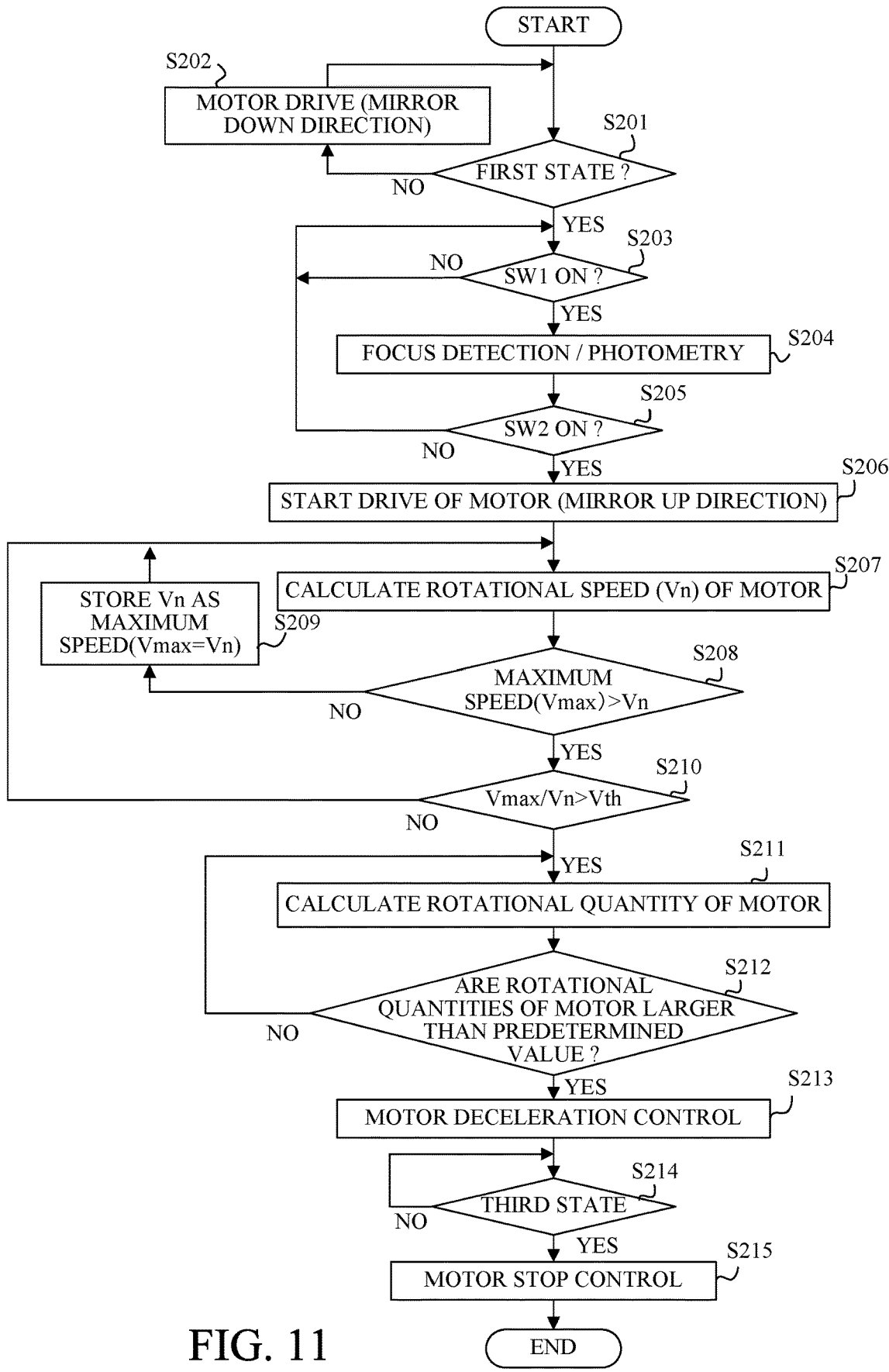
FIG. 11 is a flowchart of mirror up drive control (second example).

In this embodiment, with reference to FIG. 11, a driving method of the motor 1 different from that of the first example will be explained. FIG. 11 is a flowchart of mirror up drive control according to this example.

At step S201, the position detector 113 determines whether or not the mirror unit 500 is in the first state. If the mirror unit 500 is in the first state, the flow advances to step S203, and otherwise, the flow advances to step S202. At step S202, the motor 1 is driven in a mirror down direction until the mirror unit 500 becomes in the first state.

At step S203, whether or not the SW1 of the release switch 106 is turned on is determined. If the SW1 is turned on, the flow advances to step S204, and otherwise, the flow repeats a loop to step S203. At step S204, the focusing detector 107 performs focus detection, and the photometric sensor 110 performs photometry.

At step S205, whether or not the SW2 of the release switch 106 is turned on is determined. If the SW2 is turned on, the flow advances to step S206, and otherwise, the flow returns to step S203.

At step S206, the sub mirror 503 is driven by the motor 1 so that the mirror unit 500 becomes in the second state. Then, the memory 102 resets a storing maximum speed (Vmax) of the rotational speed of the motor 1. At step S207, the CPU 101 obtains the rotational quantity of the motor 1 by counting the FB pulse, and calculates the rotational speed (Vn) of the motor 1 on the basis of the pulse width of the FB pulses.

At step S208, the CPU 101 determines whether or not the rotational speed (Vn) is larger than the maximum speed (Vmax) of the motor 1 stored in the memory 102. If the rotational speed (Vn) is larger than the maximum speed (Vmax), the flow advances to step S209, and otherwise, the flow advances to step S210. At step S209, the memory 102 stores the rotational speed (Vn) as the maximum speed (Vmax).

At step S210, the CPU 101 determines whether or not an operation value (speed ratio) Vmax/V is larger than a predetermined value Vth. The operation value Vmax/Vn is larger than the predetermined value Vth, the flow advances to step S211, and otherwise, the flow returns to step S207. When the operation value Vmax/Vn is larger than the predetermined value Vth, the CPU 101 determines that the mirror unit 500 is in the second state. After step S210, the mirror unit 500 is driven to be in the third state. At step S211, the CPU 101 calculates the rotational quantity of the motor 1 using the FB pulse.

At step S212, the CPU 101 determines whether or not the rotational quantity of the motor 1 is larger than a predetermined value. If the rotational quantity of the motor 1 is larger than the predetermined value, the flow advances to step S213, and otherwise, the flow returns to step S211. At step S213, the CPU 101 performs deceleration control to decelerate the motor 1.

At step S214, whether or not the mirror unit 500 is in the third state is determined. Whether or not the mirror unit 500 is in the third state may be determined using the position detector 113, or may be determined using whether or not the rotational quantity of the motor 1 reaches a predetermined rotational quantity. At step S215, the CPU 101 performs stop control to stop the drive of the motor 1.

As explained above, in this example, controlling the motor 1 using the FB pulse can suppress variations of a mirror driving speed due to a temperature and the number of times for the mirror drive.

Next, with reference to FIGS. 12A and 12B, a relation between the attitude of the main body 100 and a correction value of the predetermined value Vth using at step S210 of FIG. 11 will be explained. FIGS. 12A and 12B are explanatory diagrams of the attitude of the main body and the correction value. When the main body 100 rotates around the X-axis and the Z-axis of FIG. 12A, a relation between a moving (rotational) direction and a gravity direction of the sub mirror 503 changes, and thus, the rotational speed of the motor 1 varies. Accordingly, when the main body 100 rotates around the X-axis and the Z-axis, correcting the predetermined value (Vth) is required.

In this example, the attitude detector 105 is an acceleration sensor and detects acceleration in triaxial directions (X-axis direction, Y-axis direction and Z-axis direction) orthogonal each other of FIG. 12A. The CPU 101 calculates the rotational angle around each axis of the main body 100 on the basis of the acceleration detected by the attitude detector 105.

FIG. 12B is a correction value table corresponding to the rotational axis of the main body 100 around the X-axis and the Z-axis. A X-axis rotational angle, which is the rotational axis of the main body 100 around the X-axis, is 0 degree when the acceleration in the Y-axis direction is the positive direction and the acceleration in the Z-axis direction is 0, 90 degrees when the acceleration in the Y-axis direction is 0 and the acceleration in the Z-axis direction is the positive direction, −90 degrees when the acceleration in the Y-axis direction is 0 and the acceleration in the Z-axis direction is the negative direction, and 180 degrees when the acceleration in the Y-axis direction is the negative direction and the acceleration in the Z-axis direction is 0. A Z-axis rotational angle, which is the rotational axis of the main body 100 around the Z-axis, is 0 degree when the acceleration in the X-axis direction is 0 and the acceleration in the Y-axis direction is the positive direction, 90 degrees when the acceleration in the X-axis direction is the positive direction and the acceleration in the Y-axis direction is 0, −90 degrees when the acceleration in the X-axis direction is the negative direction and the acceleration in the Y-axis direction is 0, and 180 degrees when the acceleration in the X-axis direction is 0 and the acceleration in the Y-axis direction is the negative direction.

When obtaining the rotational angles of the main body 100 around the X-axis and the Z-axis from the attitude detector 105, the CPU 101 determines the correction value Ann (A11 to A99) of the predetermined value Vth using the correction table of FIG. 12B. In this example, the predetermined value Vth is Vth0 when the rotational angles of the main body 100 around the X-axis and the Z-axis are respectively within ±15 degrees, and the CPU 101 calculates the predetermined value Vth (=Vth0+Ann) using the correction value Ann.

Third Example

In this example, a detection method of the position of the mirror unit 500 by the position detector 113 will be explained. In this example, a rotational position of a rotating plate 115 of the mirror drive mechanism 112 is detected to detect the position of the mirror unit 500. Additionally, in this example, when the rotating plate 115 rotates by 1 degree, one FB pulse is output. The CPU 101 counts the obtained FB pulse, and obtains the rotational quantity of the motor 1 on the basis of the counted value (counter value).

FIG. 13 is a positional relation diagram of the position detector 113 and the rotating plate 115. The rotating plate 115 is provided with slits Slit1 and Slit2. The rotating plate 115, which can rotate around a center position O, rotates counterclockwise by 5 degrees and rotates clockwise by 50 degrees when the state of the rotating plate 115 illustrated in FIG. 13 is 0 degree. In the following explanations, the angle around the counterclockwise direction will be explained as the negative angle. The position detector 113 includes two photo interrupters PI1 and PI2. As the position detector 113, a hall element and a MR element may be used to detect the rotational position of the rotating plate 115. The photo interrupters PI1 and PI2 may be also separately provided.

As illustrated in FIG. 2, the photo interrupters PI1 and PI2 respectively output the detection signal to the CPU 101 through a PI1 signal line and a PI2 signal line. An output signal level of the PI1 signal line is "Low" when light from a light projector of the photo interrupter PI1 is received by a light receiver through the slit Slit1, and is "Hi" when the light is blocked by the rotating plate 115. Alternatively, an output signal level of the PI2 signal line is "Low" when light from a light projector of the photo interrupter PI2 is received by a light receiver through the slit Slit2, and is "Hi" when the light is blocked by the rotating plate 115. The CPU 101 controls On/Off of the power source 114 using a PIPow signal line. When an output signal level of the PIPow signal line is "Hi", the power source 114 is turned on and power is supplied to each photo interrupter of the position detector 113. Besides, when the output signal level is "Low", the power source 114 is turned off and power supply to each photo interrupter of the position detector 113 is stopped. The CPU 101 may control power supply to the photo interrupters PI1 and PI2, individually.

FIGS. 14A to 14F are positional relation diagrams of each photo interrupter of the position detector 113, the rotating plate 115 and the main mirror 501 when the mirror unit 500 drives. FIGS. 14A to 14F illustrate states each having the rotational angle of the rotating plate 115 of −5, 0, 5, 40, 45 and 50 degrees, respectively. The main mirror 501 is positioned at the mirror down position when being in the state of FIG. 14B, and is positioned at the mirror up position when being the in state of FIG. 14E. FIG. 15A to 15C are waveforms illustrating each signal that varies at every time.

Figure 16:
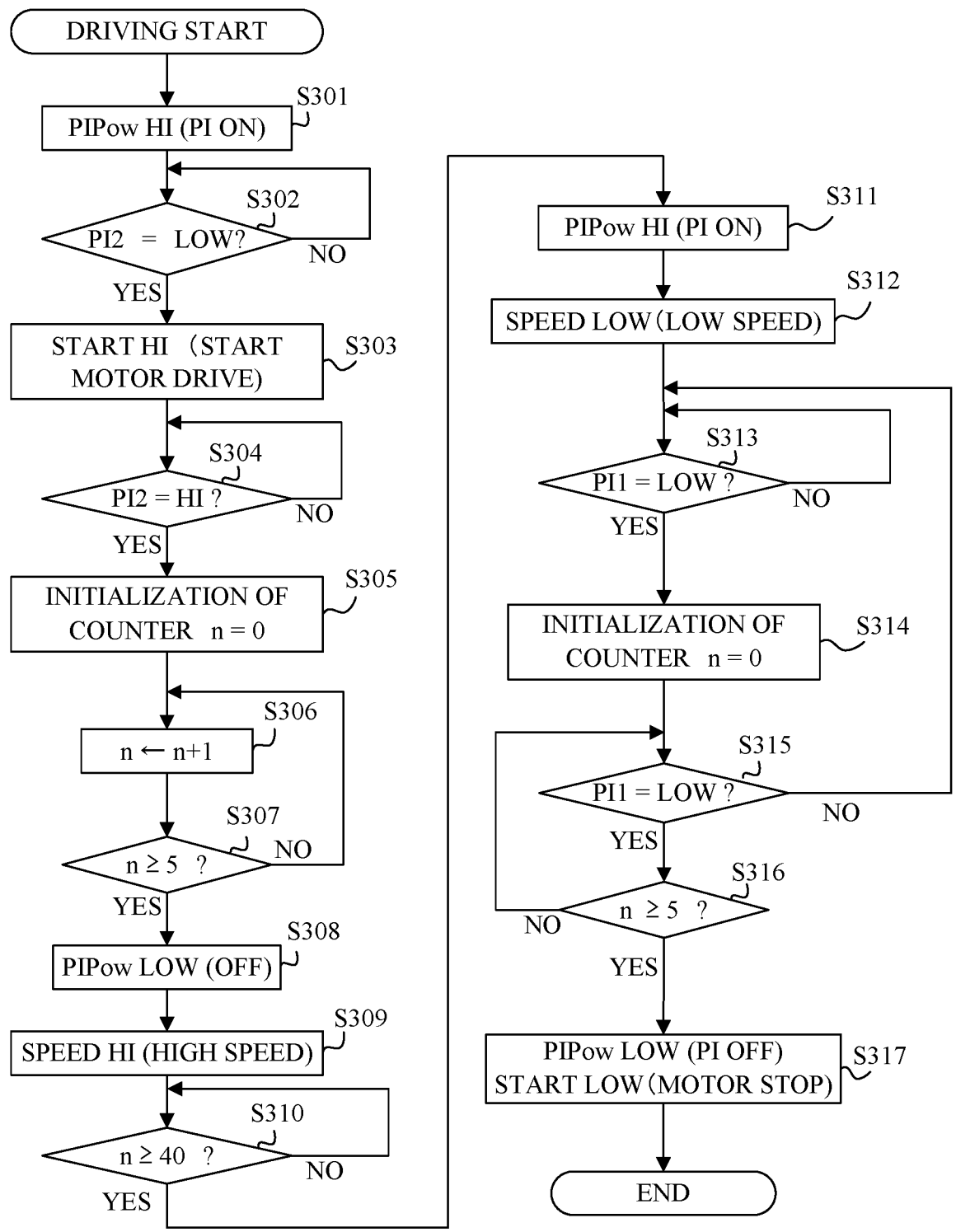
FIG. 16 is a flowchart of mirror drive control (third example).

With reference to FIG. 16, a detection method of the position of the rotating plate 115 by the position detector 113 to detect the position of the mirror unit 500 will be explained. FIG. 16 is a flowchart of mirror drive control according to this example.

Figure 14A:
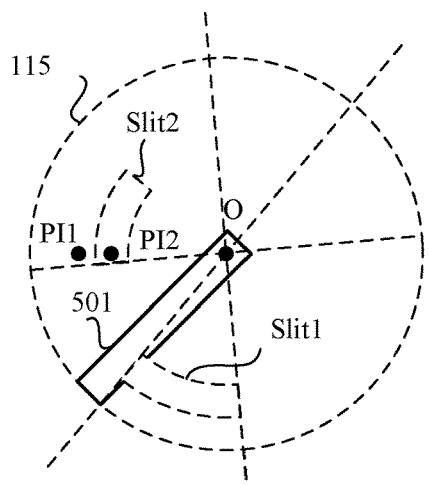
FIGS. 14A to 14F are positional relation diagrams of each photo interrupter of the position detector, a rotating plate and a main mirror when a mirror unit drives (third example).
Figure 15A:
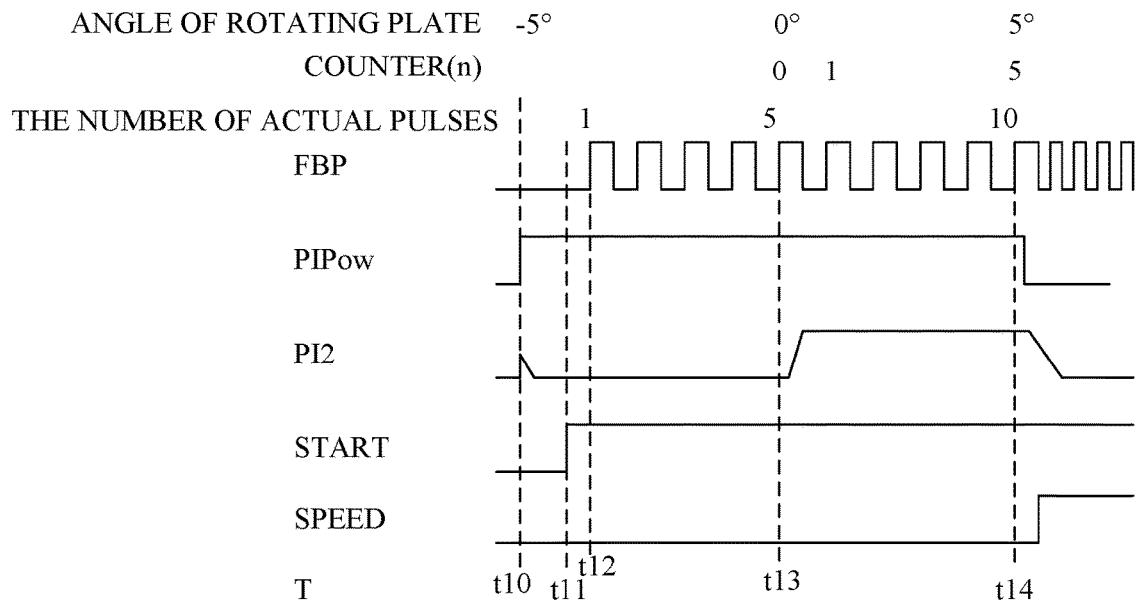
FIGS. 15A to 15C are waveforms illustrating each signal that varies at every time (third example).
Figure 15B:
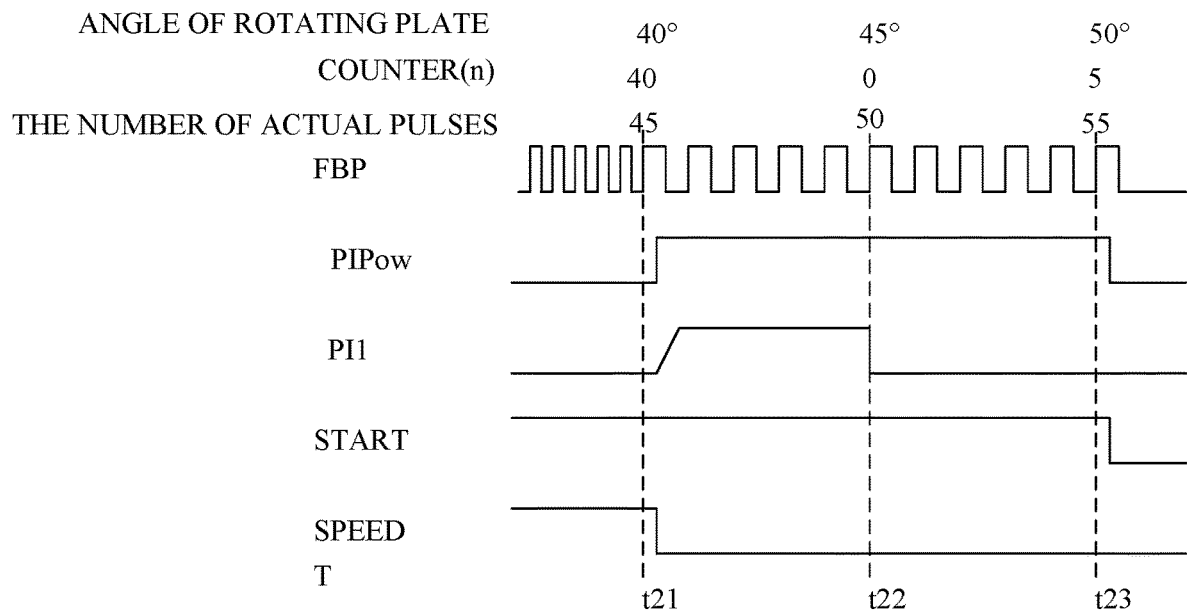
Figure 15C:
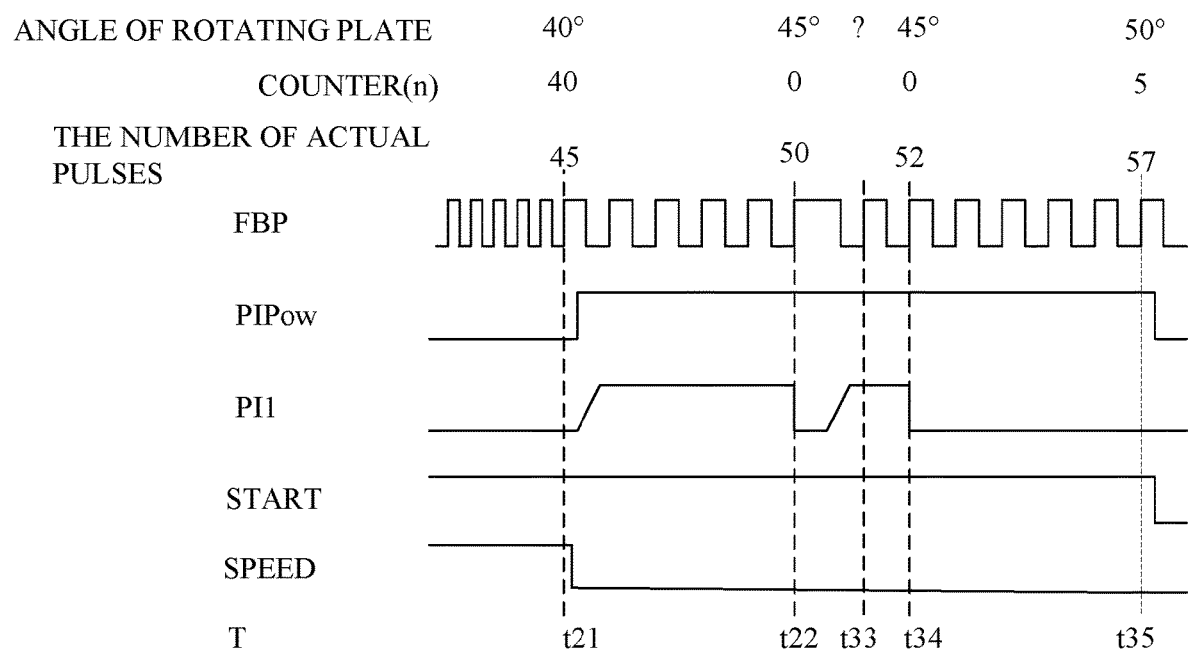

The rotating plate 115 is in the state of FIG. 14A before starting the mirror up drive. The main mirror 501 is positioned at the mirror down position by a regulating mechanism (not illustrated).

At step S301, the CPU 101 makes the output signal level of the PIPow signal line "Hi" and supplies power to the position detector 113 to check whether or not the rotating plate 115 is in the state of FIG. 14A (time "t10" of FIG. 15A). When power is supplied to the position detector 113, the light from the light projector of the photo interrupter PI2 is, as illustrated in FIG. 14A, received by the light receiver through the slit Slit2, and thus the output signal level of the PI2 signal line becomes "Low".

At step S302, the CPU 101 determines whether or not the output signal level of the PI2 signal line is "Low". If the output signal level is "Low", the flow advances to step S303, and otherwise, the flow repeats a loop to step S302.

Figure 14D:
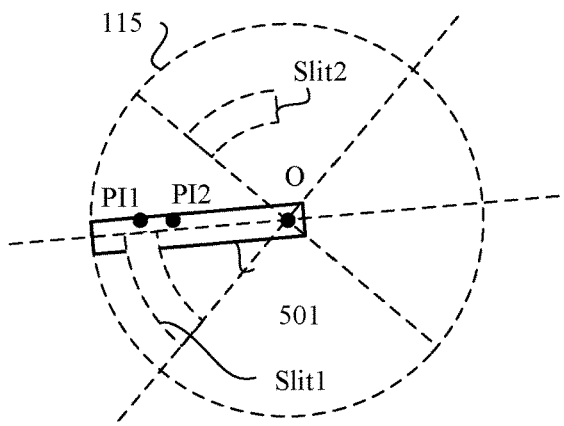
Figure 14B:
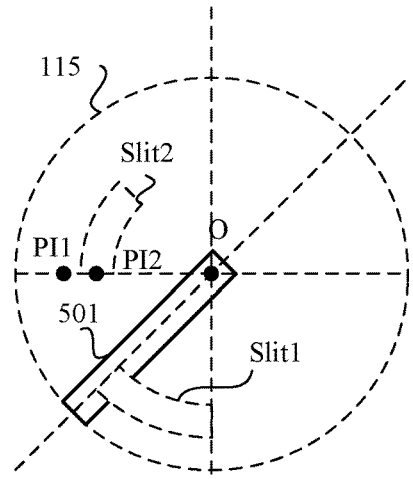

At step S303, the CPU 101 makes the output signal level of the START signal line "Hi" to drive the motor 1 (time "t11" of FIG. 15A). When the rotor 3 rotates, the selector 302 outputs the FB pulse to the CPU 101 (time "t12" of FIG. 15A). The rotating plate 115 also rotates. As one pulse of the FB pulses corresponds to the rotational angle of the rotating plate 115 of 1 degree, when 5 FB pulses are output, the rotating plate 115 rotates by 5 degrees and becomes in the state in FIG. 14B. Then, as illustrated in FIG. 14B, the photo interrupter PI2 is positioned at an end of the slit Slit2, and if the rotating plate 115 further rotates, the light from the light projector of the photo interrupter PI2 is blocked by the rotating plate 115 and the output signal level of the PI2 signal line becomes "Hi".

At step S304, the CPU 101 determines whether or not the output signal level of the PI2 signal line is "Hi". If the output signal level is "Hi", the flow advances to step S305, and otherwise, the flow repeats a loop to step S304.

At step S305, the CPU 101 resets the counter value to 0 (time "t13" of FIG. 15A). A large current is flowed in the position detector 113, but as further sharpening the rise of the output signal of the PI2 signal line is required to detect the motor rotating at a higher speed, the current flowed in the position detector 113 may be further increased. At step S306, the CPU 101 counts up the counter value every time when obtaining the FB pulse.

At step S307, the CPU 101 determines whether or not the counter value is larger than 5. If the counter value is larger than 5, the flow advances to step S308, and otherwise, the flow returns to step S306. In this example, a threshold value of the counter value is 5, but the present invention is not limited to this.

At step S308, the CPU 101 makes the output signal level of the PIPow signal line "Low", and stops power supply to the position detector 113 (time "t14" of FIG. 15A). This is because the rotation of the motor 1 and the drive of the main mirror 501 can be considered to be performed stably when the CPU 101 obtains 5 FB pulses at step S307, and thus the output of the photo interrupter becomes unnecessary. As the current in the photo interrupter PI2 is a large current, stopping power supply to the position detector 113 can save energy. In this example, power supply to the position detector 113 is stopped on the basis of the counter value, that is, the rotational quantity of the motor 1, but may be stopped when the output signal level of the PI2 signal line becomes "Hi". The rotating plate 115 is in the state of FIG. 14C.

At step S309, the CPU 101 makes the output signal level of the SPEED signal line "Hi" to rotate the motor 1 at "high speed" and counts up the counter value.

At step S310, the CPU 101 determines whether or not the counter value is larger than 40. If the counter value is larger than 40, the flow advances to step S311, and otherwise, the flow repeats a loop to step S310. In this example, a threshold value of the counter value is 40, but the present invention is not limited to this.

At step S311, the CPU 101 makes the output signal level of the PIPow signal line "Hi" and supplies power to the position detector 113 (time "t21" of FIG. 15B). Then, the rotating plate 115 is in the state of FIG. 14D. As illustrated in FIG. 14D, the rotating plate 115 blocks the light from the light projector of the photo interrupter PI1, and thus the output signal level of the PI1 signal line becomes "Hi". Deviations between members from the rotor 3 to the rotating plate 115 may occur due to an assembly error and permanence, and as a result, the counter value held by the CPU 101 may be different from the actual value. In this example, the output of the photo interrupter PI1 is used to stop the main mirror 501 at the mirror up position. At step S312, the CPU 101 makes the output signal level of the SPEED signal line "Low" to rotate the motor 1 at "low speed".

Figure 14E:
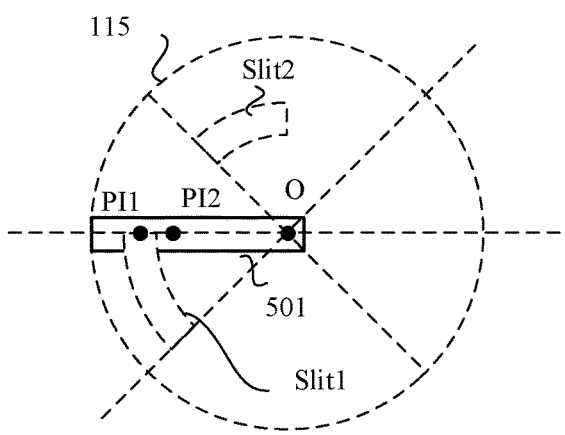
Figure 14C:
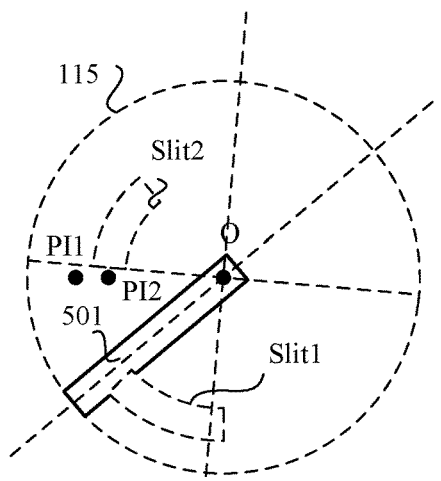
Figure 14F:
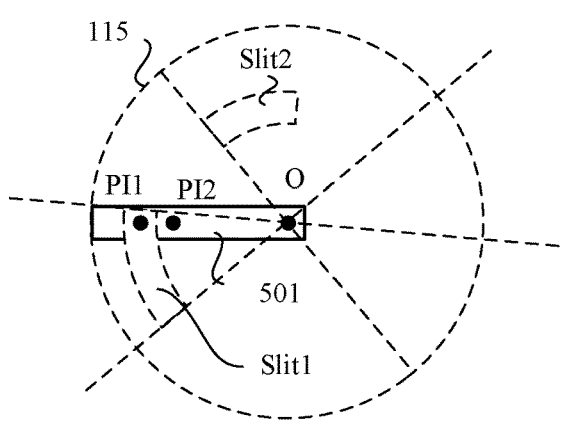

At step S313, the CPU 101 determines whether or not the output signal level of the PI1 signal line is "Low". If the output signal level is "Low", the flow advances to step S314, and otherwise, the flow repeats a loop to step S313. In the state of FIG. 14E, the output signal level of the PI1 signal line is "Low", the main mirror 501 reaches the mirror up position, and the rotational angle of the rotating plate 115 becomes 45 degrees. As illustrated in FIG. 14E, the light from the light projector of the photo interrupter PI1 is received by the light receiver through the slit Slit1.

At step S314, the CPU 101 initializes the counter value to 0 (time "t22" of FIG. 15B). The CPU 101 further drives the motor 1 to rotate the rotating plate 115 clockwise, but the main mirror 501 is regulated by the mirror up stopper 505 to be positioned at the mirror up position.

At step S315, the CPU 101 determines whether or not the output signal level of the PI1 signal line is "Low". When, after the rotational angle of the rotating plate 115 becomes 45 degrees at step S313, the rotating plate 115 further rotates clockwise, the light from the light projector of the photo interrupter PI1 is received by the light receiver through the slit Slit1. Accordingly, the output signal level of the photo interrupter PI1 has been "Low" since step S313, and thus, the flow usually advances to step S316. However, when the speed of the main mirror 501 in reaching the mirror up position is larger than a predetermined speed, the main mirror 501 bounds and the rotating plate 115 rotates counterclockwise. Thus, the rotational angle of the rotating plate 115 is smaller than 45 degrees, the light from the light projector of the photo interrupter PI1 is blocked by the rotating plate 115, and the output signal level of PI1 signal line becomes "Hi" (time "t33" of FIG. 15C). When the output signal level is "Hi", the flow returns to step S313. In this example, as the CPU 101 cannot recognize how much the main mirror 501 rotates counterclockwise using the FB pulse, and thus continuously drives the motor 1 clockwise until the output signal level of the PI1 signal line becomes "Li". When the output signal level becomes "Low" (time "t34" of FIG. 15C), the flow advances to step S315 after advancing to step S314 again.

At step S316, the CPU 101 determines whether or not the counter value is larger than 5. If the counter value is larger than 5, the flow advances to step S316, and otherwise, the flow returns to step S315. In this example, the threshold value of the counter value is 5, but the present invention is not limited to this.

At step S317, the CPU 101 makes the output signal level of the PIPow signal line "Low" to stop power supply to the position detector 113 (time "t23" of FIG. 15B and time "t35" of FIG. 15C). The CPU 101 further makes the output signal level of the START signal line "Low" to stop the drive of the motor 1. Then, the rotating plate 115 becomes in the state of FIG. 14F. The main mirror 501 is also positioned at the mirror up position.

In this example, the mirror up drive was explained, but, in the mirror down drive, performing control contrary to the mirror up drive can obtain the same effect.

Fourth Example

In this example, a method to suppress a bound of each mirror occurred when the mirror unit 500 is in the first and third states will be explained. The position detector 113 detects whether or not the main mirror 501 is positioned within a mirror up detection region. A position where the position detector 113 detects arrival of the main mirror holder 502 at the mirror up position detection region is different from a position where the main mirror holder 502 collides with the mirror up stopper 505. Accordingly, the main mirror 502 can perform the mirror up drive until colliding with the mirror up stopper 505 after the position detector 113 detects the arrival of the main mirror holder 502 at the mirror up position detection region. The position detector 113 also detects whether the main mirror holder 502 is positioned within a mirror down position detection region. A position where the position detector 113 detects arrival of the main mirror holder 502 at the mirror down position detection region is different from a position where the main mirror holder 502 collides with the mirror down stopper 506. Accordingly, the main mirror 502 can perform the mirror down drive until colliding with the mirror down stopper 506 after the position detector 113 detects the arrival of the main mirror holder 502 at the mirror down position detection region. The position detector 113 also transmits a timing where the main mirror holder 502 becomes in the state positioning within each detection region from the state positioning outside each detection region, and a timing where the main mirror holder 502 becomes in the state positioning outside each detection region from the state positioning within each detection region to the CPU 101.

Figure 17A:
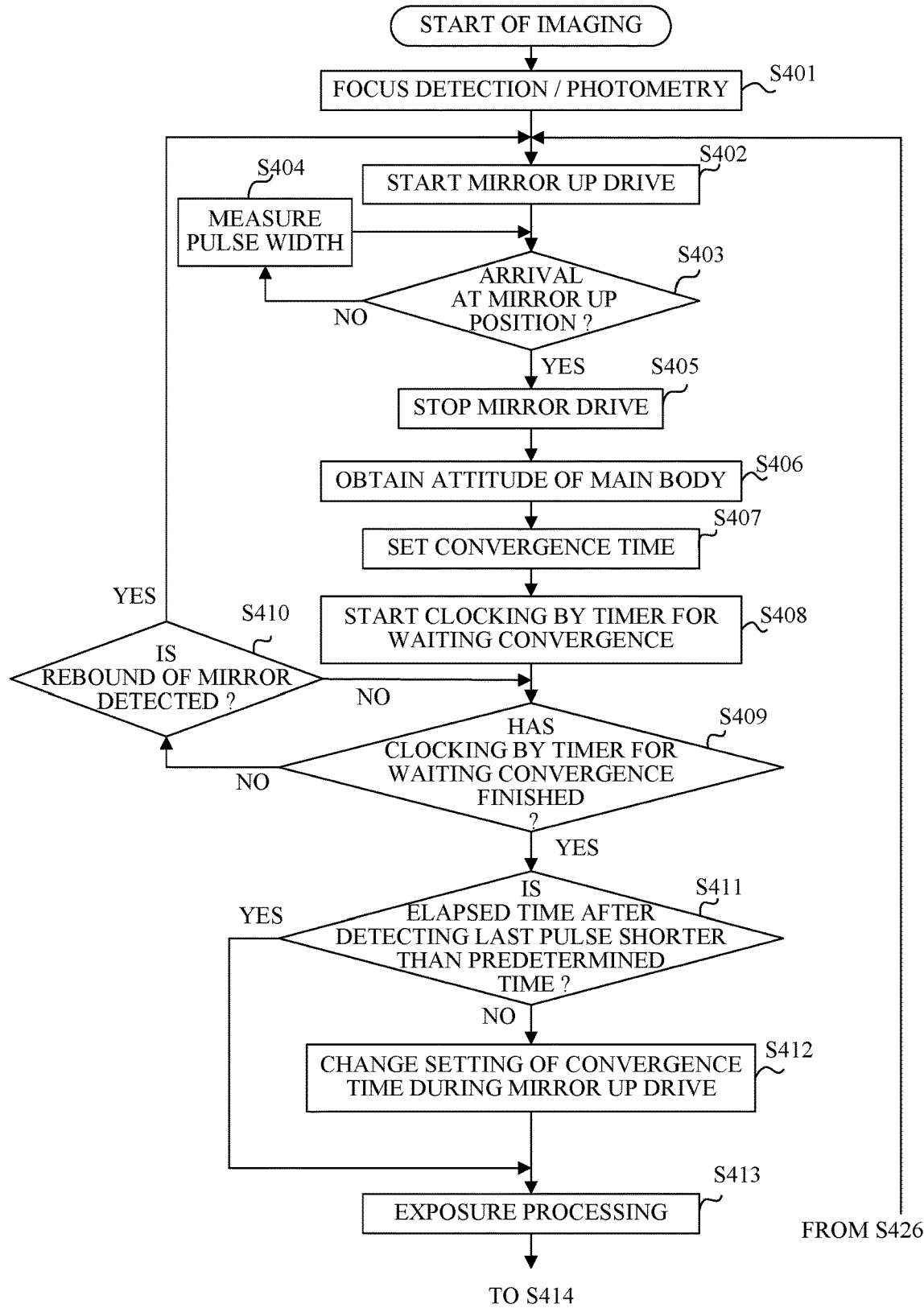
FIGS. 17A and 17B are flowcharts of an imaging operation (fourth example).
Figure 17B:
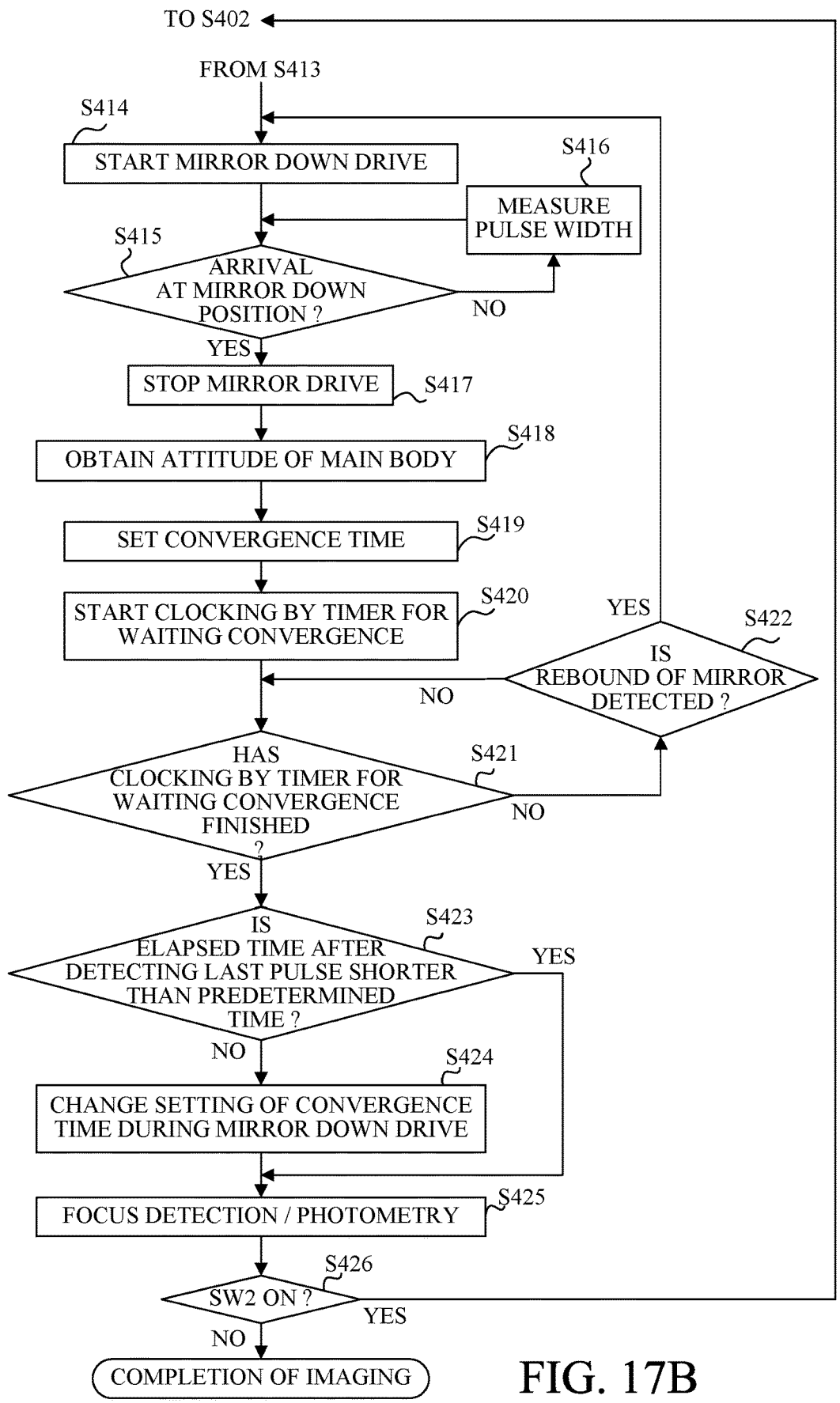

FIGS. 17A and 17B are flowcharts of an imaging operation according to this example. At step S401, the focusing detector 107 performs the focus detection and the photometric sensor 110 performs the photometry. At step S402, the mirror unit 500 starts the mirror up drive. The CPU 101 controls the drive of the motor 1 on the basis of the FB pulse during the mirror up drive.

At step S403, the CPU 101 determines whether or not the position detector 113 detects the arrival of the main mirror holder 502 at the mirror up position detection region. If the position detector 113 detects the arrival of the main mirror holder 502 at the mirror up position detection region, the flow advances to step S405, and otherwise, the flow advances to step S404. At step S404, the CPU 101 measures the pulse width of the FB pulses. At step S405, the CPU 101 stops the drive of the motor 1 to stop the mirror up drive. At step S406, the CPU 101 obtains the attitude of the main body 100 from the attitude detector 105.

At step S407, the CPU 101 sets a time (hereinafter referred to as "convergence time") until a vibration of the mirror unit 500 converges on the basis of a pulse wide immediately before the main mirror holder 502 reaches the mirror up position detection region and the attitude of the main body 100. In this example, the convergence time is set on the basis of a Table 3 using the pulse width immediately before the main mirror holder 502 reaches the mirror up position detection region and the attitude of the main body 100 as parameters. As shown in the Table 3, as the pulse width immediately before the main mirror holder 502 reaches the mirror up position detection region is shorter, that is, the rotational speed of the motor 1 immediately before the main mirror holder 502 reaches the mirror up detection region is higher, the convergence time is longer. Moreover, the convergence time when the attitude of the main body 100 is the horizontal attitude and the reverse attitude is longer than that when the attitude of the main body 100 is the normal attitude (usual attitude). The convergence time may be obtained using an operational expression previously stored in the CPU 101.

TABLE 3

| | Stable timer (ms) | | | | | |
| --- | --- | --- | --- | --- | --- | --- |
| | Mirror up drive | | | Mirror down drive | | |
| Last pulse width(μs) | Normal attitude | Horizontal attitude | Reverse attitude | Normal attitude | Horizontal attitude | Reverse attitude |
| 0-500 | 10 | 12 | 14 | 14 | 12 | 10 |
| 500-1500 | 8 | 10 | 12 | 12 | 10 | 8 |
| 1500-2500 | 5 | 7 | 9 | 9 | 7 | 5 |
| 2500- | 3 | 5 | 7 | 7 | 5 | 3 |

At step S408, the CPU 101 measures the elapse of the convergence time set at step S407. At step S409, the CPU 101 determines whether or not the measured time is equal to or longer than the convergence time. When the measured time is equal to or longer than the convergence time, the flow advances to step S411, and otherwise, the flow advances to step S410. At step S410, the CPU 101 determines whether or not the position detector 113 detects that the main mirror holder 502 is positioned outside the mirror up position detection region. The mirror unit 500 continuously moves by inertia during a predetermined time after the motor 1 stops at step S405. When the reaching speed of the main mirror holder 502 to the mirror up position detection region is large, the main mirror holder 502 may be positioned outside the mirror up position detection region after colliding with the mirror up stopper 505. When exposure is performed in this state, part of each mirror can be imaged on the image. In this example, when the position detector 113 detects that the main mirror holder 502 is positioned outside the mirror up position region, the mirror unit 500 starts the mirror up drive again.

As mentioned above, the convergence time is set using the pulse width immediately before the main mirror holder 502 reaches the mirror up position detection region and the attitude of the main body 100 as a parameter. However, the convergence time may be changed by abrasion due to permanence of the mirror unit 500. In this example, to correspond this change, the convergence time is changed according to the operation such as the main mirror holder 502. At step S405, as the driving speed of the mirror unit 500 is not 0 after the motor 1 stops, the CPU 101 obtains the FB pulse. The vibration of the mirror unit 500 does not converge while the CPU 101 obtains the FB pulse. At step S411, when the convergence time has been elapsed, the CPU 101 determines whether or not a sufficient time for converging the vibration of the mirror unit 500 has been passed after detecting the last FB pulse. If the sufficient time has been passed, the flow advances to step S413, and otherwise, the flow advances to step S412.

At step S412, a setting table for the convergence time is changed. This is because the time until the vibration of the mirror unit 500 convergences after the position detector 113 detects the arrival of the main mirror holder 502 at the mirror up position detection region is deemed to be changed due to permanence of the mirror. The operational expression stored in the CPU 101 may be updated.

After exposure processing at step S413, the mirror unit 500 starts the mirror down drive at step S414. The CPU 101 controls the drive of the motor 1 on the basis of the FB pulse during the mirror down drive.

At step S415, the CPU 101 determines whether or not the position detector 113 detects the arrival of the main mirror holder 502 at the mirror down position detection region. If the position detector 113 detects the arrival of the main mirror holder 502 at the mirror down position detection region, the flow advances to step S416, and otherwise, the flow advances to step S417. At step S416, the CPU 101 measures the pulse width of the FB pulses. At step S417, the CPU 101 stops the drive of the motor 1 to stop the mirror down drive. At step S418, the CPU 101 obtains the attitude of the main body 100 from the attitude detector 105.

At step S419, the CPU 101 sets the convergence time on the basis of the pulse wide immediately before the mirror unit 500 reaches the mirror down position detection region and the attitude of the main body 100. In this example, the convergence time is set on the basis of the Table 3 using the pulse width immediately before the main mirror holder 502 reaches the mirror down position detection region and the attitude of the main body 100 as parameters. As shown in the Table 3, as the pulse width immediately before the main mirror holder 502 reaches the mirror down position detection region is shorter, that is, the rotational speed of the motor 1 immediately before the main mirror holder 502 reaches the mirror down detection region is higher, the convergence time is longer. Moreover, the convergence time when the attitude of the main body 100 is the normal attitude is longer than that when the attitude of the main body 100 is the horizontal attitude and the reverse attitude. The convergence time may be obtained using the operational expression previously stored in the CPU 101.

At step S420, the CPU 101 measures the elapse of the convergence time set at step S419. At step S421, the CPU 101 determines whether or not the measured time is equal to or longer than the convergence time. When the measured time is equal to or longer than the convergence time, the flow advances to step S423, and otherwise, the flow advances to step S422. At step S422, the CPU 101 determines whether or not the position detector 113 detects that the main mirror holder 502 is positioned outside the mirror down position detection region. When the position detector 113 detects that the main mirror holder 502 is positioned outside the mirror down position region, the mirror unit 500 starts the mirror down drive again.

At step S423, when the convergence time has been elapsed, the CPU 101 determines whether or not a sufficient time for converging the vibration of the mirror unit 500 has been passed after detecting the last FB pulse. If the sufficient time has been passed, the flow advances to step S425, and otherwise, the flow advances to step S424. At step S424, the setting table for the convergence time is changed. At step S425, for next imaging, the focusing detector 107 performs the focus detection and the photometric sensor 110 performs the photometry. At step S426, whether or not the SW2 is turned on is determined. If the SW2 is turned on, the imaging operation is completed, and otherwise, the mirror unit 500 starts the mirror up drive.

Fifth Example

Figure 18:
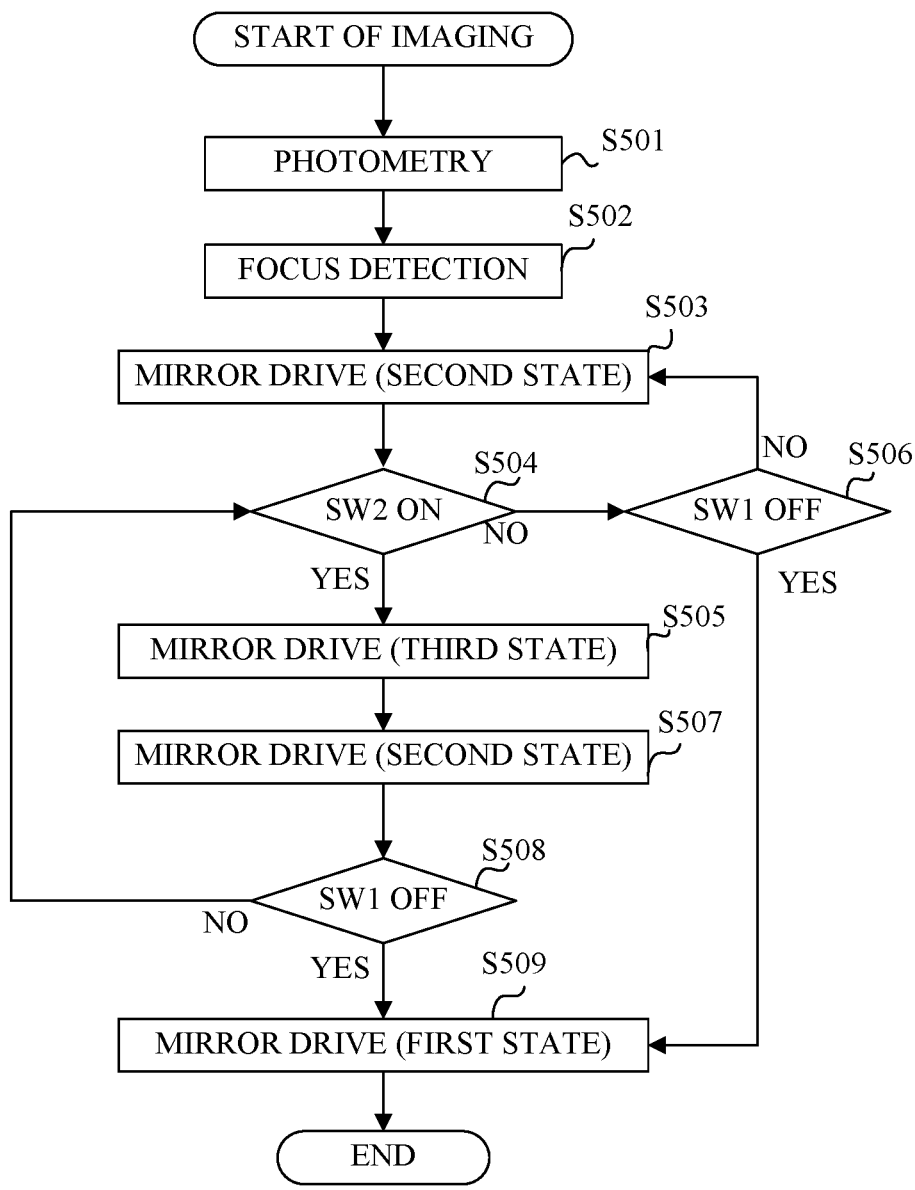
FIG. 18 is a flow chart of correction control of photometric sensor (fifth example).

FIG. 18 is a flowchart of correction control of the photometric sensor 110 according to this example. In this example, a focus mode of the main body 100 is set to an AF mode for one-shot AF.

At step S501, the SW1 is turned on, and the photometric sensor 110 starts the photometry. Then, the photometric circuit 111 corrects a luminance signal using the output correcting chart of FIG. 8A. At step S502, the focusing detector 107 performs the focus detection.

At step S503, the sub mirror holder 504 rotates, and thus the mirror unit 500 becomes in the second state from the first state. As the light quantity to the photometric sensor 110 is varied during the rotation of the sub mirror holder 504, the photometric circuit 111 holds the luminance signal before the rotation of the sub mirror holder 504 until the mirror unit 500 becomes in the second state. Additionally, after the mirror unit 500 becomes in the second state, the photometric circuit 111 corrects the luminance signal using the output correcting chart of FIG. 8B.

At step S504, whether or not the SW2 is turned on is determined. If the SW2 is turned on, the flow advances to step S505, and otherwise, the flow advances to step S506. At step S506, whether or not the SW1 is turned off is determined. If the SW1 is turned off, the flow advances to step S509, and otherwise, the flow repeats a loop to step S504.

At step S505, the main mirror holder 502 and the sub mirror holder 504 rotate, and thus the mirror unit 500 becomes in the third state from the second state. When the mirror unit 500 is in the third state, the imaging is performed. At step S507, the main mirror holder 502 and the sub mirror holder 504 rotate, and thus the mirror unit 500 becomes in the second state from the third state.

At step S508, whether or not the SW1 is turned off is determined. If the SW1 is turned off, the flow advances to step S509, and otherwise, the flow returns to step S504. At step S509, the sub mirror holder 504 rotates, and thus the mirror unit 500 becomes in the first state from the second state. As the light quantity to the photometric sensor 110 is varied during the rotation of the sub mirror holder 504, the photometric circuit 111 holds the luminance signal before the rotation of the sub mirror holder 504 until the mirror unit 500 becomes in the first state. After the mirror unit 500 becomes in the first state, the photometric circuit 111 corrects the luminance signal using the output correcting chart of FIG. 8A.

As explained above, in this example, after the focus detection processing, the output value from the photometric sensor 111 can be corrected when the mirror unit 500 becomes in the second state.

Sixth Example

Figure 19:
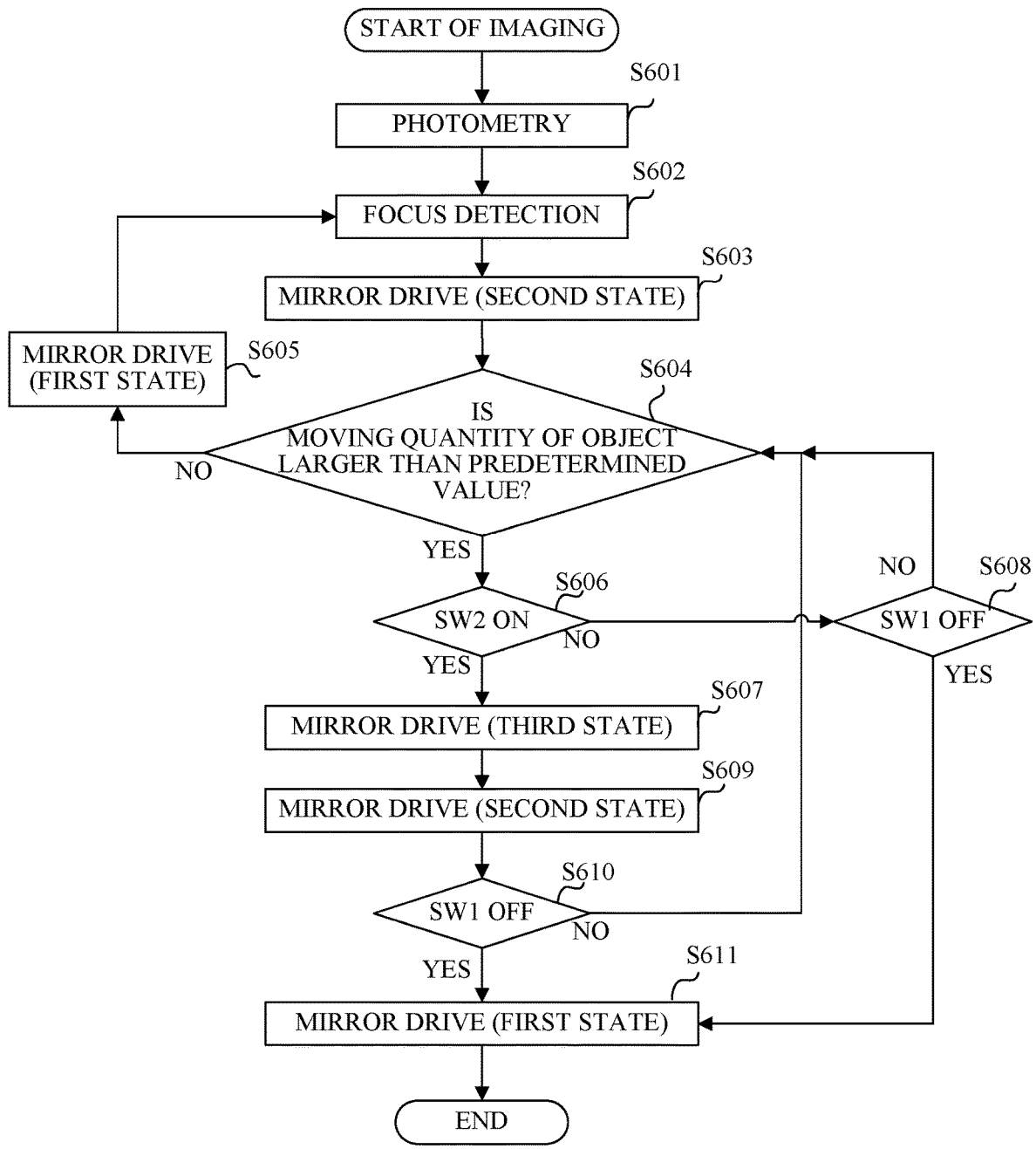
FIG. 19 is a flow chart of correction control of photometric sensor (sixth example).

FIG. 19 is a flowchart of correction control of the photometric sensor 110 according to this example. In this example, a focus mode of the main body 100 is set to an AF mode for one-shot AF.

At step S601, the SW1 is turned on, and the photometric sensor 110 starts the photometry. Then, the photometric circuit 111 corrects the luminance signal using the output correcting chart of FIG. 8A. At step S602, the focusing detector 107 performs the focus detection.

At step S603, the sub mirror holder 504 rotates, and thus the mirror unit 500 becomes in the second state from the first state. After the mirror unit 500 becomes in the second state, the photometric sensor 111 corrects the luminance signal using the output correcting chart of FIG. 8B.

At step S604, the photometric sensor 110 determines whether or not a moving quantity of an object is larger than a predetermined value. The predetermined value is set on the basis of influence on focusing. If the moving quantity is larger than the predetermined value, the flow advances to step S605, and otherwise, the flow advances to step S606.

At step S605, the sub mirror holder 504 rotates, and thus the mirror unit 500 becomes in the first state from the second state. Then, the photometric sensor 111 corrects the luminance signal using the output correcting chart of FIG. 8A.

At step S606, whether or not the SW2 is turned on is determined. If the SW2 is turned on, the flow advances to step S607, and otherwise, the flow advances to step S608. At step S608, whether or not the SW1 is turned off is determined. If the SW1 is turned off, the flow advances to step S611, and otherwise, the flow returns to step S604.

At step S607, the main mirror holder 502 and the sub mirror holder 504 rotate, and thus the mirror unit 500 becomes in the third state from the second state. When the mirror unit 500 is in the third state, the imaging is performed. At step S609, the main mirror holder 502 and the sub mirror holder 504 rotate, and thus the mirror unit 500 becomes in the second state from the third state.

At step S610, whether or not the SW1 is turned off is determined. If the SW1 is turned off, the flow advances to step S611, and otherwise, the flow returns to step S604. At step S611, the sub mirror holder 504 rotates, and thus the mirror unit 500 becomes in the first state from the second state. After the mirror unit 500 becomes in the first state, the photometric circuit 111 corrects the luminance signal using the output correcting chart of FIG. 8A.

As explained above, in this example, after the focus detection processing in the state where the object does not move, the output value from the photometric circuit 111 can be corrected when the mirror unit 500 becomes in the second state.

Seventh Example

Figure 20:
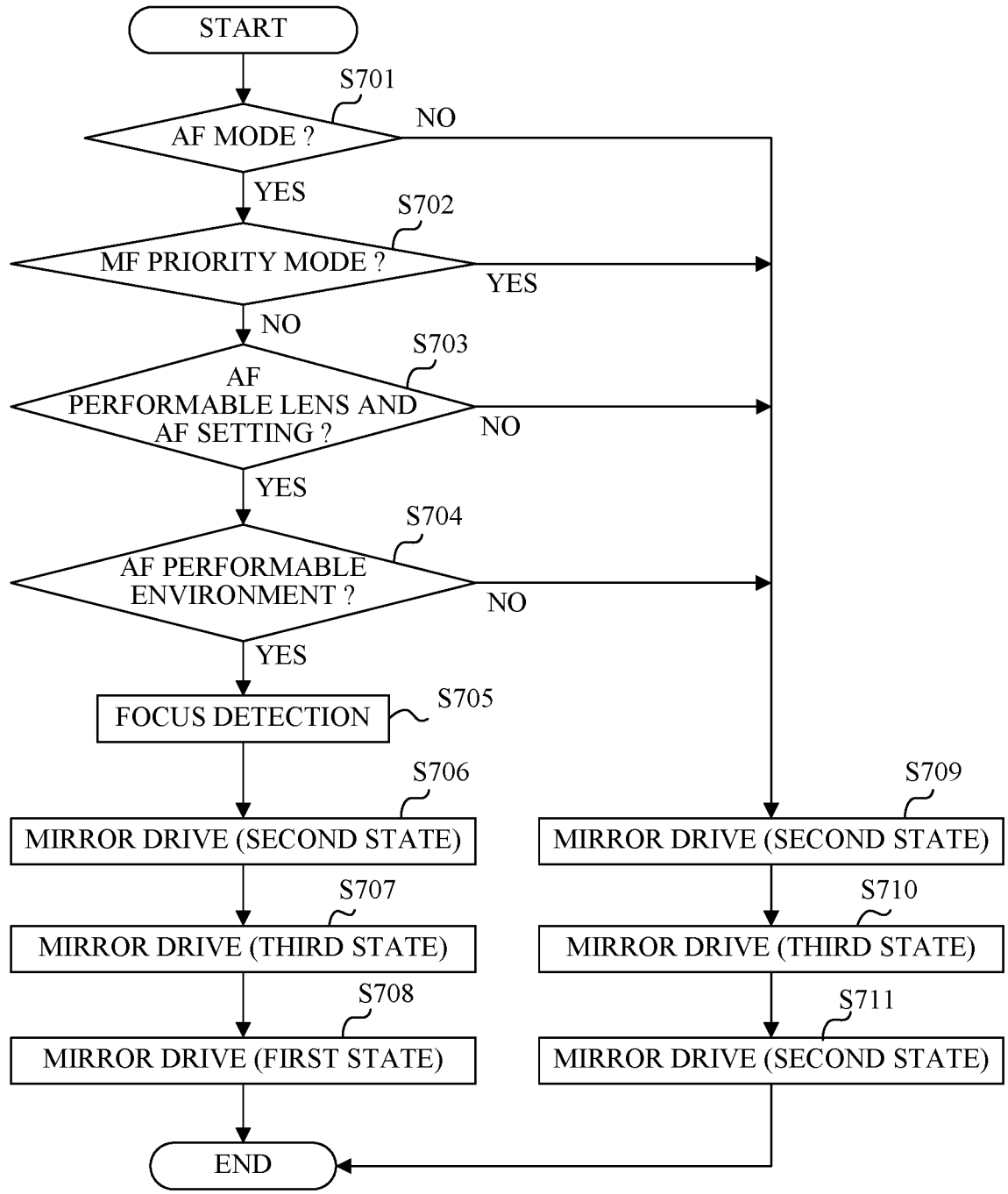
FIG. 20 is a flow chart of correction control of photometric sensor (seventh example).

FIG. 20 is a flowchart of correction control of the photometric sensor 110 according to this example.

At step S701, the CPU 101 determines whether or not a focus mode is an AF mode. If the focus mode is the AF mode, the flow advances to step S702, and if the focus mode is a MF mode, the flow advances to step S709.

At step S702, the CPU 101 determines whether or not the camera mode is set to a MF priority mode. If the MF priority mode is set, the flow advances to step S709, and otherwise, the flow advances to step S703. The MF priority mode is, for example, a watching mode and a MF priority macro imaging mode. The watching mode is a mode to utilize a digital single lens reflex camera like a telescope. The MF priority macro imaging mode is a mode to perform close-up imaging.

At step S703, the CPU 101 determines whether or not the lens 200 is an AF performable lens and whether or not an AF setting is set. If the lens 200 is the AF performable lens and the AF setting is set, the flow advances to step S704, and otherwise, the flow advances to step S709.

At step S704, the CPU 101 determines whether or not an environment is an AF performable luminance environment on the basis of, for example, the luminance signal of the photometric sensor 111. If the environment is the AF performable luminance environment, the flow advances to step S705, and if the environment is not the AF performable environment, that is, is an environment darker than a low luminance limit, the flow advances to step S709.

At step S705, the focusing detector 107 performs the focus detection. At step S706, the sub mirror holder 504 rotates, and thus the mirror unit 500 becomes in the second state from the first state. After the mirror unit 500 becomes in the second state, the photometric circuit 111 corrects the luminance signal using the output correcting chart of FIG. 8B.

At step S707, the SW2 is turned on, and the main mirror holder 502 and the sub mirror holder 504 rotate so that the mirror unit 500 becomes in the third state from the second state. When the mirror unit 500 is in the third state, the imaging is performed. At step S708, the mirror unit 500 becomes in the first state. Moreover, after the mirror unit 500 becomes in the first state, the photometric sensor 111 corrects the luminance signal using the output correcting chart of FIG. 8A.

At step S709, the sub mirror holder 504 rotates, and thus the mirror unit 500 becomes in the second state from the first state. After the mirror unit 500 becomes in the second state, the photometric circuit 111 corrects the luminance signal using the output correcting chart of FIG. 8B.

At step S710, the SW2 is turned on, and the main mirror holder 502 and the sub mirror holder 504 rotate so that the mirror unit 500 becomes in the third state from the second state. When the mirror unit 500 is in the third state, the imaging is performed. At step S711, the sub mirror holder 504 rotates, and thus the mirror unit 500 becomes in the second state.

As explained above, in this example, when the focus mode is the MF mode and the mirror unit 500 becomes in the second state, the output value of the photometric circuit 111 can be corrected.

Eighth Example

Figure 21:
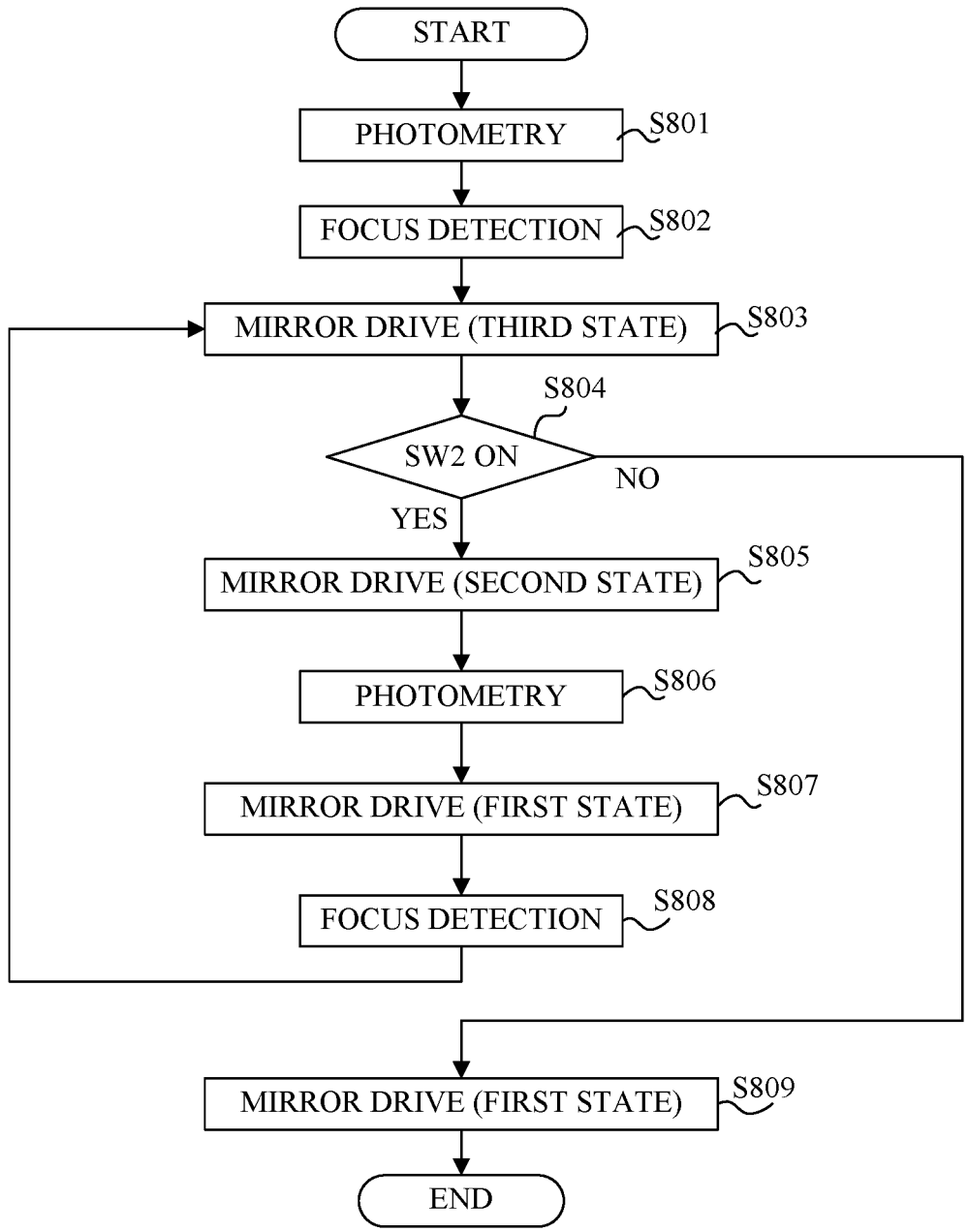
FIG. 21 is a flowchart of a servo AF continuous imaging operation (eighth example).
Figure 22:
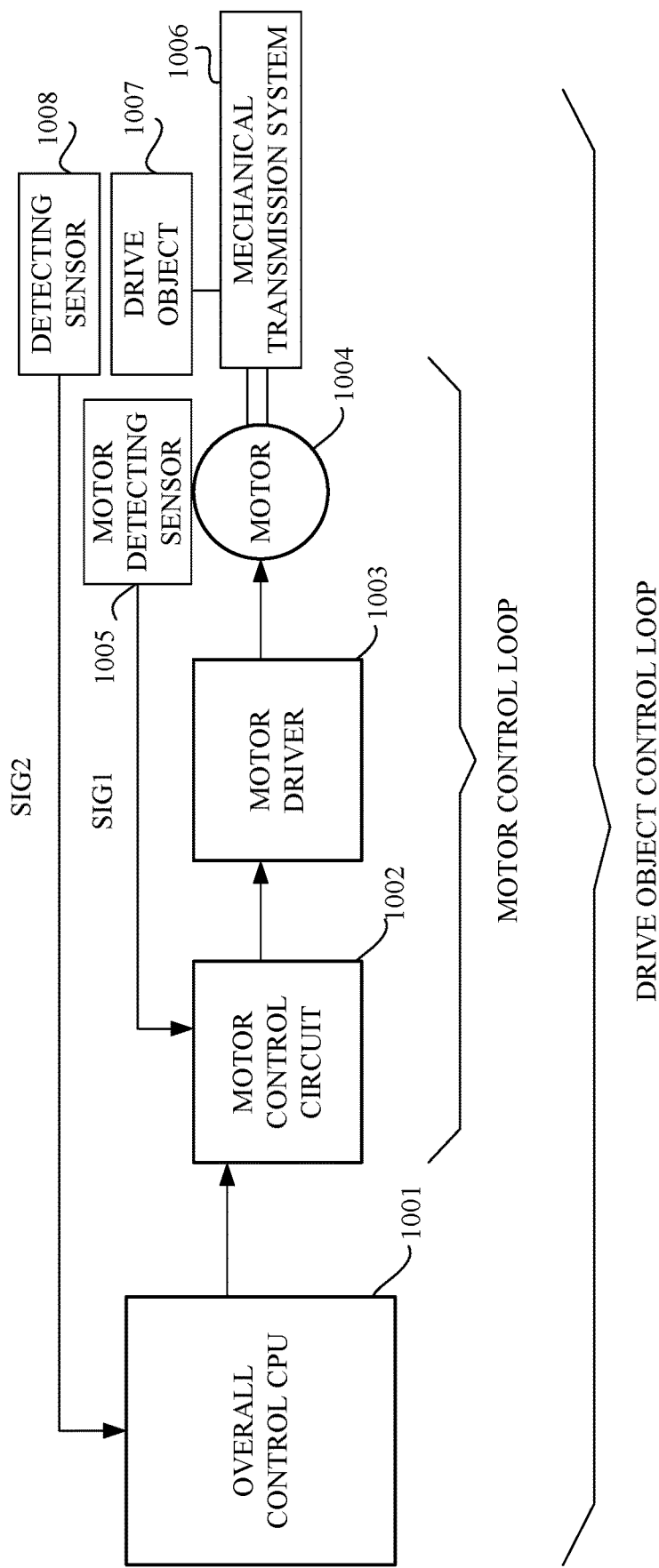
FIG. 22 is a block diagram of an apparatus including a conventional motor driving apparatus.

In this example, with reference to FIG. 21, a sequence during servo AF continuous imaging will be explained. FIG. 21 is a flowchart of a servo AF continuous imaging operation.

At step S801, the SW1 is turned on, and the photometric sensor 110 starts the photometry. At step S802, the CPU 101 performs the focus detection on the basis of the luminance signal obtained from the photometric circuit 111. At step S803, the SW2 is turned on, and the mirror unit 500 becomes in the third state. When the mirror unit 500 is in the third state, the imaging is performed.

At step S804, whether or not the SW2 is turned on is determined. If the SW2 is turned on, the flow advances to step S805, and otherwise, the flow advances to step S809.

At step S805, the main mirror holder 502 and the sub mirror holder 504 rotate, and thus the mirror unit 500 becomes in the second state from the third state. At step S806, the photometric sensor 110 starts the photometry. Then, the photometric circuit 111 corrects the luminance signal using the output correcting chart of FIG. 8B

At step S807, the sub mirror holder 504 rotates, and thus the mirror unit 500 become in the first state from the second state. At Step S808, the CPU 101 performs the focus detection on the basis of the luminance signal obtained from the photometric circuit 111. Subsequently, the flow returns to step S803. At step S809, the mirror unit 500 becomes in the first state, and the imaging operation is completed.

As explained above, in this example, as the photometry can be performed during the servo continuous imaging when the mirror unit 500 is in the second state, and after the mirror unit 500 becomes in the first state, the focus detection can be performed, the continuous speed can increase.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010183, filed on Jan. 21, 2016, which is hereby incorporated by reference herein in its entirety.

What is claimed is:

1. A motor driving apparatus for driving a motor including a rotor that is rotatable and that has a magnet whose outer peripheral surface divided in a circumferential direction is magnetized in multiple poles with alternating different polarities, the motor driving apparatus comprising:
   a selecting unit configured to select several detecting elements from a first detecting element, a second detecting element, a third detecting element, and a fourth detecting element, each of which detects a magnet pole of the magnet;
   a driving unit configured to obtain a driving signal using signals output from the selected detecting elements and drive the motor based on the driving signal; and
   a controlling unit configured to obtain a rotational quantity of the motor using signals output from the first and second detecting elements, obtain a control signal from the rotational quantity of the motor, and output the control signal to the selecting unit,
   wherein the controlling unit does not use signals output from the third and fourth detecting elements to obtain the rotational quantity even if the selecting unit selects the third and fourth elements.

2. The motor driving apparatus according to claim 1, wherein the controlling unit obtains a composite signal of the signals output from the first and second detecting elements and obtains the rotational quantity of the motor on the basis of the composite signal.

3. The motor driving apparatus according to claim 2, wherein the composite signal is a pulse signal corresponding to a rotational position of the rotor.

4. The motor driving apparatus according to claim 3, wherein the controlling unit obtains a rotational speed of the motor on the basis of a pulse width of the pulse signal.

5. The motor driving apparatus according to claim 1, wherein a phase of a signal output from the first detecting element is shifted from a phase of a signal output from the second detecting signal by 45 degrees.

6. The motor driving apparatus according to claim 1, wherein the control signal includes at least any one of a signal related to a start and a stop of a drive of the motor, a signal related to a rotational direction of the motor, and a signal related to a rotational speed of the motor.

7. The motor driving apparatus according to claim 1,
   wherein when the motor is rotated in a first direction at a first speed, the selecting unit selects the first and second detecting elements,
   wherein when the motor is rotated in the first direction at a second speed lower than the first speed, the selecting unit selects the third and fourth detecting elements,
   wherein when the motor is rotated in a second direction opposite to the first direction at a third speed, the selecting unit selects the third and fourth detecting elements, and
   wherein when the motor is rotated in the second direction at a fourth speed lower than the third speed, the selecting unit selects the first and second detecting elements.

8. The motor driving apparatus according to claim 1, wherein the first to fourth detecting elements are hall elements.

9. The motor driving apparatus according to claim 1, wherein the selecting unit selects the several detecting elements on the basis of the control signal which is obtained from the rotational quantity of the motor.

10. The motor driving apparatus according to claim 1,
    wherein the control signal includes at least any one of a signal indicating a rotational direction of the motor and a signal indicating a rotational speed of the motor, and
    wherein the selecting unit selects the several detection elements based on at least one of the signal indicating the rotational direction of the motor and the signal indicating the rotational speed of the motor from the controlling unit.

11. The motor driving apparatus according to claim 10, wherein the control signal includes the signal indicating the rotational direction of the motor and the signal indicating the rotational speed of the motor, and
    wherein the selecting unit selects the several detection elements based on the signal indicating the rotational direction of the motor and the signal indicating the rotational velocity of the motor.

12. The motor driving apparatus according to claim 1, further comprising the motor including the first detecting unit, the second detecting unit, the third detecting unit, and the fourth detecting unit.

13. A method for driving a motor including a rotor that is rotatable and that has a magnet whose outer peripheral surface divided in a circumferential direction is magnetized in multiple poles with alternating different polarities, the method comprising:
 a selecting step for selecting several detecting elements from a first detecting element, a second detecting element, a third detecting element, and a fourth detecting element, each of which detects a magnet pole of the magnet
 a driving step for obtaining a driving signal using signals output from the selected detecting elements and driving the motor based on the driving signal;
 an obtaining step for obtaining a rotational quantity of the motor using signals output from the first and second detecting elements and obtaining a control signal from the rotational quantity of the motor, and
 an outputting step for outputting the control signal to a selecting unit of the motor,
 wherein the obtaining step does not use signals output from the third and fourth detecting elements to obtain the rotational quantity even if the selecting step selects the third and fourth elements.

14. A non-transitory computer-readable medium configured to store a method for driving a motor including a rotor that is rotatable and that has a magnet whose outer peripheral surface divided in a circumferential direction is magnetized in multiple poles with alternating different polarities, the method comprising:
 a selecting step for selecting several detecting elements from a first detecting element, a second detecting element, a third detecting element, and a fourth detecting element, each of which detects a magnet pole of the magnet;
 a driving step for obtaining a driving signal using signals output from the selected detecting elements and driving the motor based on the driving signal;
 an obtaining step for obtaining a rotational quantity of the motor using signals output from the first and second detecting elements and obtaining a control signal from the rotational quantity of the motor; and
 an outputting step for outputting the control signal to a selecting unit of the motor,
 wherein the obtaining step does not use signals output from the third and fourth detecting elements to obtain the rotational quantity even if the selecting step selects the third and fourth elements.

15. The motor driving apparatus according to claim 1,
 wherein the selection unit selects the several detecting elements on the basis of the control signal which is based on the signals output from the first and second detecting elements, and
 wherein the selection unit is able to not select the first and second detecting elements.

16. The motor driving apparatus according to claim 1, wherein the controlling unit obtains the control signal based on a position signal which is obtained using signals from the first and second detecting elements, and does not use signals from the third and fourth detecting elements to obtain the control signal.

\* \* \* \* \*